United States Patent
Kiyokawa et al.

(10) Patent No.: US 9,836,658 B2
(45) Date of Patent: **\*Dec. 5, 2017**

(54) PARKING ASSIST SYSTEM

(71) Applicants: AISIN SEIKI KABUSHIKI KAISHA, Kariya-shi, Aichi-ken (JP); TOYOTA JIDOSHA KABUSHIKI KAISHA, Toyota-shi, Aichi-ken (JP)

(72) Inventors: Yusuke Kiyokawa, Nagoya (JP); Tomohisa Yamashita, Toyohashi (JP); Motonari Obayashi, Nagakute (JP); Hironobu Ishijima, Toyota (JP)

(73) Assignees: AISIN SEIKI KABUSHIKI KAISHA, Aichi-ken (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/850,116

(22) Filed: Sep. 10, 2015

(65) Prior Publication Data

US 2016/0078763 A1    Mar. 17, 2016

(30) Foreign Application Priority Data

Sep. 12, 2014 (JP) ................. 2014-186827

(51) Int. Cl.
*G06K 9/00* (2006.01)
*B62D 15/02* (2006.01)

(52) U.S. Cl.
CPC ..... *G06K 9/00798* (2013.01); *B62D 15/0285* (2013.01); *G06K 9/00805* (2013.01); *G06K 9/00812* (2013.01)

(58) Field of Classification Search
CPC .......... G06K 9/00798; G06K 9/00805; G06K 9/00812; B62D 15/0285
(Continued)

(56) References Cited

U.S. PATENT DOCUMENTS

2012/0200430 A1    8/2012    Spahl

FOREIGN PATENT DOCUMENTS

JP    2001-199298 A    7/2001
JP    2007-302065 A    11/2007
(Continued)

OTHER PUBLICATIONS

Communication dated Aug. 2, 2016 from the Japanese Patent Office in counterpart Japanese application No. 2014-186827.
(Continued)

*Primary Examiner* — Amandeep Saini
(74) *Attorney, Agent, or Firm* — Sughrue Mion, PLLC

(57) ABSTRACT

A parking assist system includes an electronic control unit configured to: set at least one candidate position that is a candidate for a target position of a moving path of a vehicle on the basis of at least one of a detection result of an obstacle and a detection result of a parking boundary; set an orientation of the vehicle at each of the at least one candidate position, as a candidate position vehicle orientation, on the basis of at least one of the detection result of the obstacle and the detection result of the parking boundary; rank each of the at least one candidate position on the basis of an orientation of the vehicle and the candidate position vehicle orientation; and determine one of the ranked at least one candidate position as the target position.

1 Claim, 18 Drawing Sheets

(58) Field of Classification Search
USPC .......................................................... 382/104
See application file for complete search history.

(56) References Cited

FOREIGN PATENT DOCUMENTS

| JP | 2011-046335 A | | 3/2011 |
|---|---|---|---|
| JP | 2011046335 A | * | 3/2011 |
| JP | 2012-1081 A | | 1/2012 |

OTHER PUBLICATIONS

Communication dated Oct. 31, 2016 from the U.S. Patent and Trademark Office in counterpart U.S. Appl. No. 14/850,187.
Communication dated Jul. 12, 2016 from the Japanese Patent Office in counterpart application No. 2014-186822.
An Office Action dated Feb. 15, 2017, which issued during the prosecution of U.S. Appl. No. 14/850,187.
Communication dated Jun. 22, 2017 from the U.S. Patent and Trademark Office in counterpart U.S. Appl. No. 14/850,187.
Communication dated May 19, 2017 from U.S. Patent & Trademark Office in counterpart U.S. Appl. No. 14/850,187.
Notice of Allowance and Fee(s) Due, dated Sep. 27, 2017, in counterpart U.S. Appl. No. 14/850,187.

* cited by examiner

F I G . 19
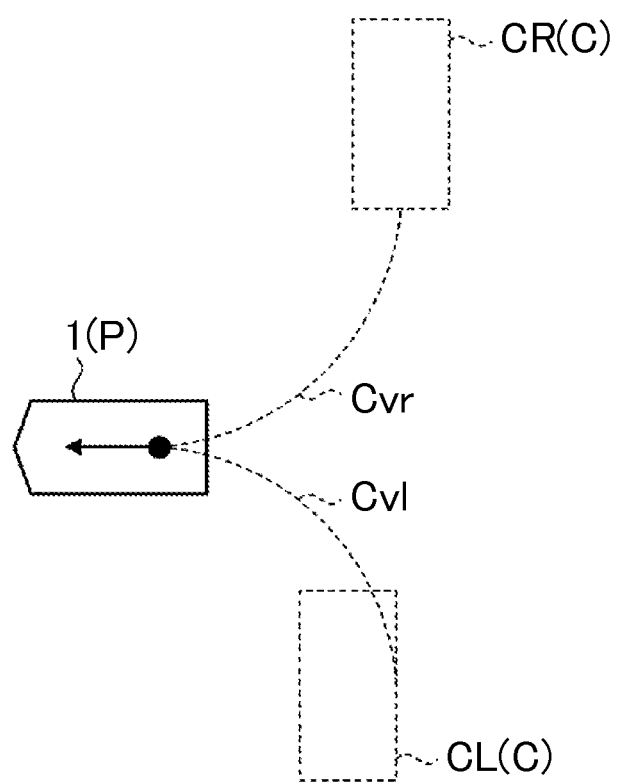

… (1)

PARKING ASSIST SYSTEM

INCORPORATION BY REFERENCE

The disclosure of Japanese Patent Application No. 2014-186827 filed on Sep. 12, 2014 including the specification, drawings and abstract is incorporated herein by reference in its entirety.

BACKGROUND OF THE INVENTION

1. Field of the Invention

The invention relates to a parking assist system.

2. Description of Related Art

Generally, there is known a parking assist system that selects a parking space on a side opposite to a turning direction of a vehicle from among right and left parking spaces as a target position for parking assist (see, for example, Japanese Patent Application Publication No. 2007-302065 (JP 2007-302065 A)).

SUMMARY OF THE INVENTION

The invention provides a parking assist system that is able to determine a candidate position that allows smoother or less inconvenient parking assist as a target position of a moving path of a vehicle, from among at least one candidate position.

An aspect of the invention relates to a parking assist system including an electronic control unit configured to: set at least one candidate position that is a candidate for a target position of a moving path of a vehicle on the basis of at least one of a detection result of an obstacle and a detection result of a parking boundary; set an orientation of the vehicle at each of the at least one candidate position, as a candidate position vehicle orientation, on the basis of at least one of the detection result of the obstacle and the detection result of the parking boundary; rank each of the at least one candidate position on the basis of an orientation of the vehicle and the candidate position vehicle orientation; and determine one of the ranked at least one candidate position as the target position. Thus, according to the above aspect, a candidate position that allows smoother or less inconvenient parking assist can be determined as the target position on the basis of the rank assigned to each candidate position on the basis of the orientation of the vehicle and the orientation of the vehicle at the corresponding candidate position.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is an exemplary perspective view of a vehicle according to an embodiment in a state where part of a cabin is seen through;

FIG. 19 is a schematic plan view for illustrating a second alternative example in which a plurality of candidate positions are ranked by the parking assist system according to the embodiment;

DETAILED DESCRIPTION OF EMBODIMENTS

Hereinafter, an exemplary embodiment of the invention will be described. The configuration of the embodiment described below, and the operation, results and advantageous effects obtained from the configuration are illustrative. The invention may be implemented by a configuration other than the configuration that will be described in the following embodiment, and may obtain at least one of various advantageous effects based on a basic configuration or secondary advantageous effects.

A vehicle 1 according to the present embodiment may be, for example, an automobile that uses an internal combustion engine (not shown) as a drive source, that is, an internal combustion engine automobile, may be an automobile that uses an electric motor (not shown) as a drive source, that is, an electric automobile, a fuel-cell automobile, or the like, may be a hybrid automobile that uses both the internal combustion engine and the electric motor as drive sources, or may be an automobile including another drive source. Various transmissions may be mounted on the vehicle 1. Various devices, such as system and components, required to drive an internal combustion engine or an electric motor may be mounted on the vehicle 1. The system, number, layout, and the like, of a device related to driving of wheels 3 in the vehicle 1 may be variously set.

Figure 1:
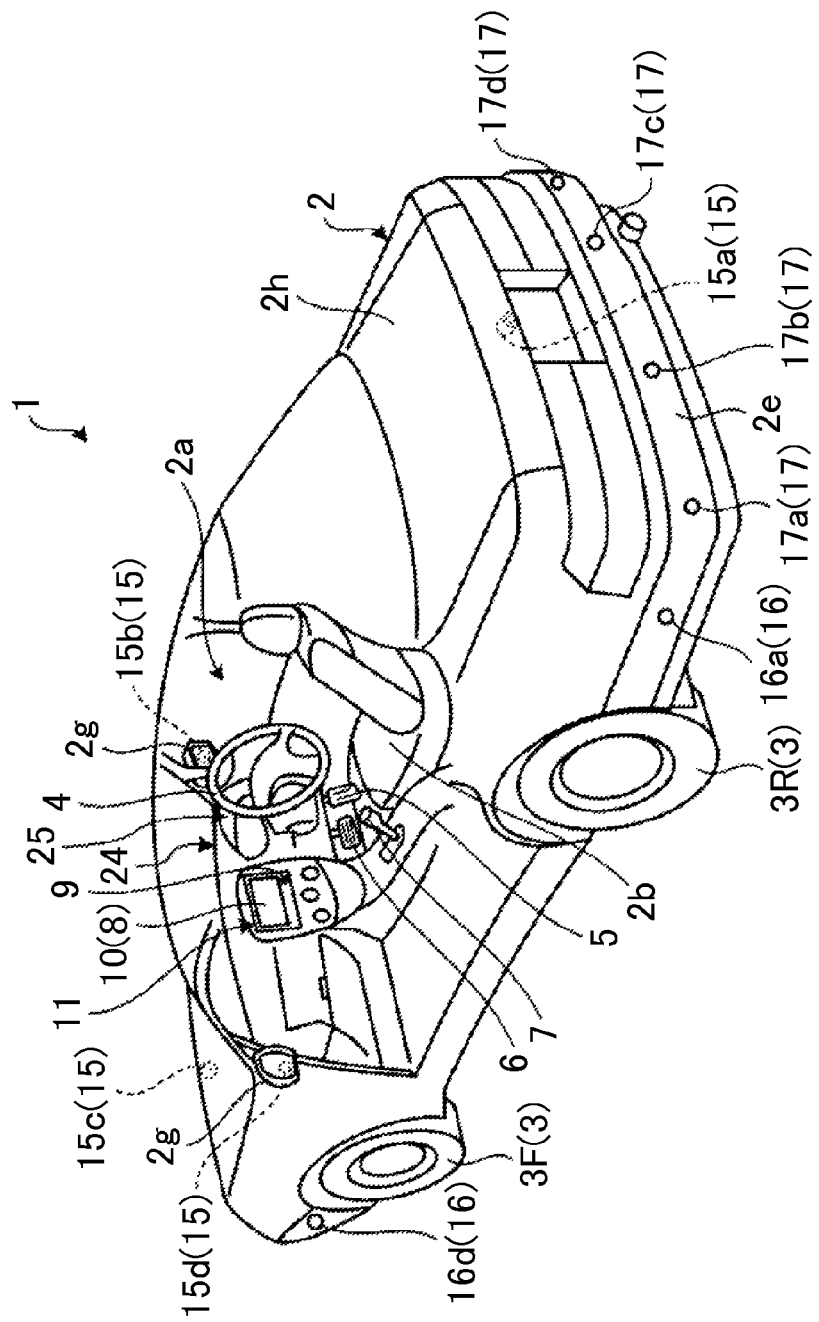

As illustrated in FIG. 1, a vehicle body 2 constitutes a cabin 2a in which an occupant (not shown) is seated. A steering unit 4, an accelerator operation unit 5, a brake operation unit 6, a shift operation unit 7, and the like, are provided near a seat 2b of a driver as an occupant inside the cabin 2a. The steering unit 4 is, for example, a steering wheel projecting from a dashboard 24. The accelerator operation unit 5 is, for example, an accelerator pedal located near driver's foot. The brake operation unit 6 is, for example, a brake pedal located near driver's foot. The shift operation unit 7 is, for example, a shift lever projecting from a center console. The steering unit 4, the accelerator operation unit 5, the brake operation unit 6, the shift operation unit 7, and the like, are not limited to these components.

A display device 8 and an audio output device 9 are provided inside the cabin 2a. The display device 8 serves as a display output unit. The audio output device 9 serves as an audio output unit. The display device 8 is, for example, a liquid crystal display (LCD), an organic electroluminescent display (OELD), or the like. The audio output device 9 is, for example, a speaker. The display device 8 is, for example, covered with a translucent operation input unit 10, such as a touch panel. An occupant is allowed to visually recognize an image that is displayed on the display screen of the display device 8 via the operation input unit 10. An occupant is allowed to perform an operation input by operating the operation input unit 10 through touching, pressing or moving the operation input unit 10 with a finger, or the like, at a position corresponding to an image that is displayed on the display screen of the display device 8. These display device 8, audio output device 9, operation input unit 10, and the like, are, for example, provided in a monitor device 11 located at the center in the vehicle width direction, that is, transverse direction, of the dashboard 24. The monitor device 11 may have an operation input unit (not shown), such as a switch, a dial, a joystick and a push button. An audio output device (not shown) may be provided at another position inside the cabin 2a, different from the monitor device 11. Audio may be output from the audio output device 9 of the monitor device 11 and another audio output device. The monitor device 11 is, for example, shared with a navigation system or an audio system.

Figure 3:
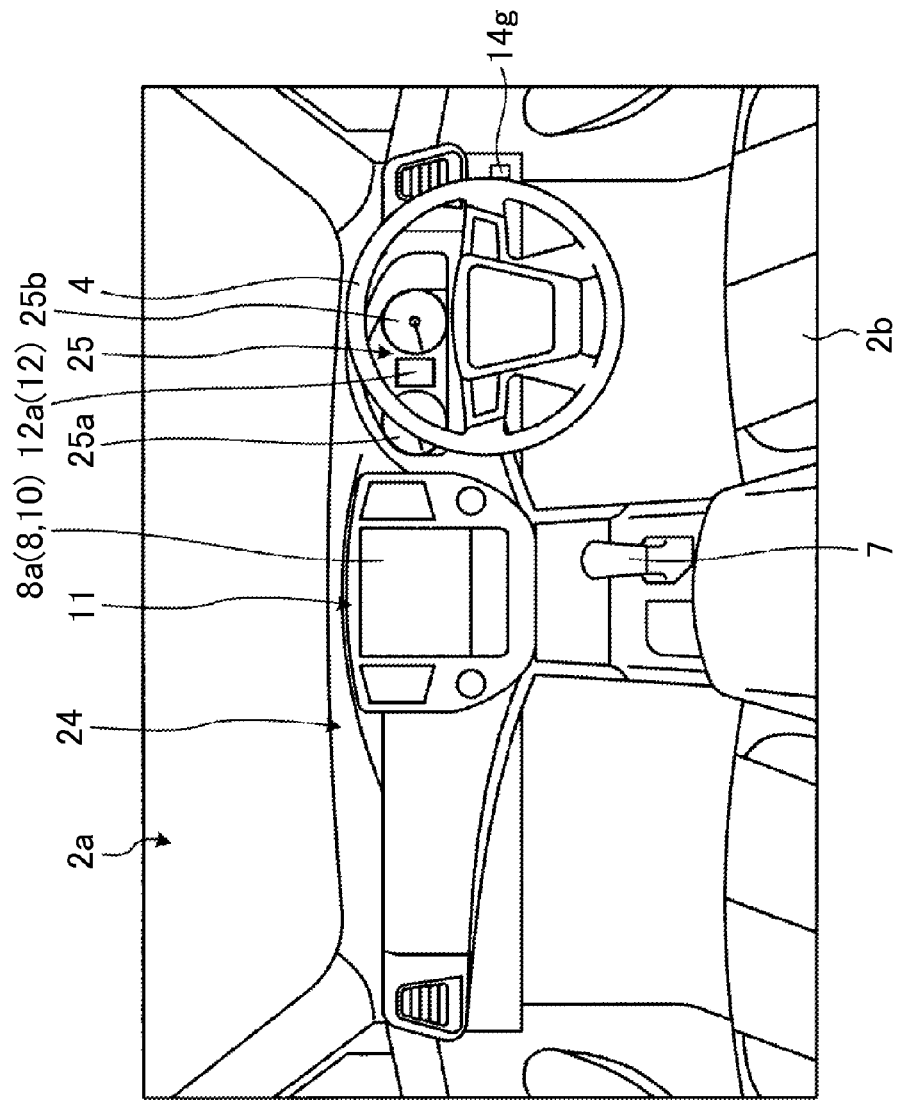
FIG. 3 is a view of an example of a dashboard of the vehicle according to the embodiment when viewed from the rear side of the vehicle.

A display device 12 different from the display device 8 is provided inside the cabin 2a. As shown in FIG. 3, the display device 12 is, for example, provided in an instrument panel unit 25 in the dashboard 24, and is located at substantially the center of the instrument panel unit 25 between a speed indicating unit 25a and a rotation speed indicating unit 25b. The size of the screen 12a of the display device 12 is smaller than the size of the screen 8a (FIG. 3) of the display device 8. An image that shows information for assisting in parking the vehicle 1 may be mainly displayed on the display device 12. The amount of information that is displayed on the display device 12 may be smaller than the amount of information that is displayed on the display device 8. The display device 12 is, for example, an LCD, an OELD, or the like. Information that is displayed on the display device 12 may be displayed on the display device 8.

Figure 2:
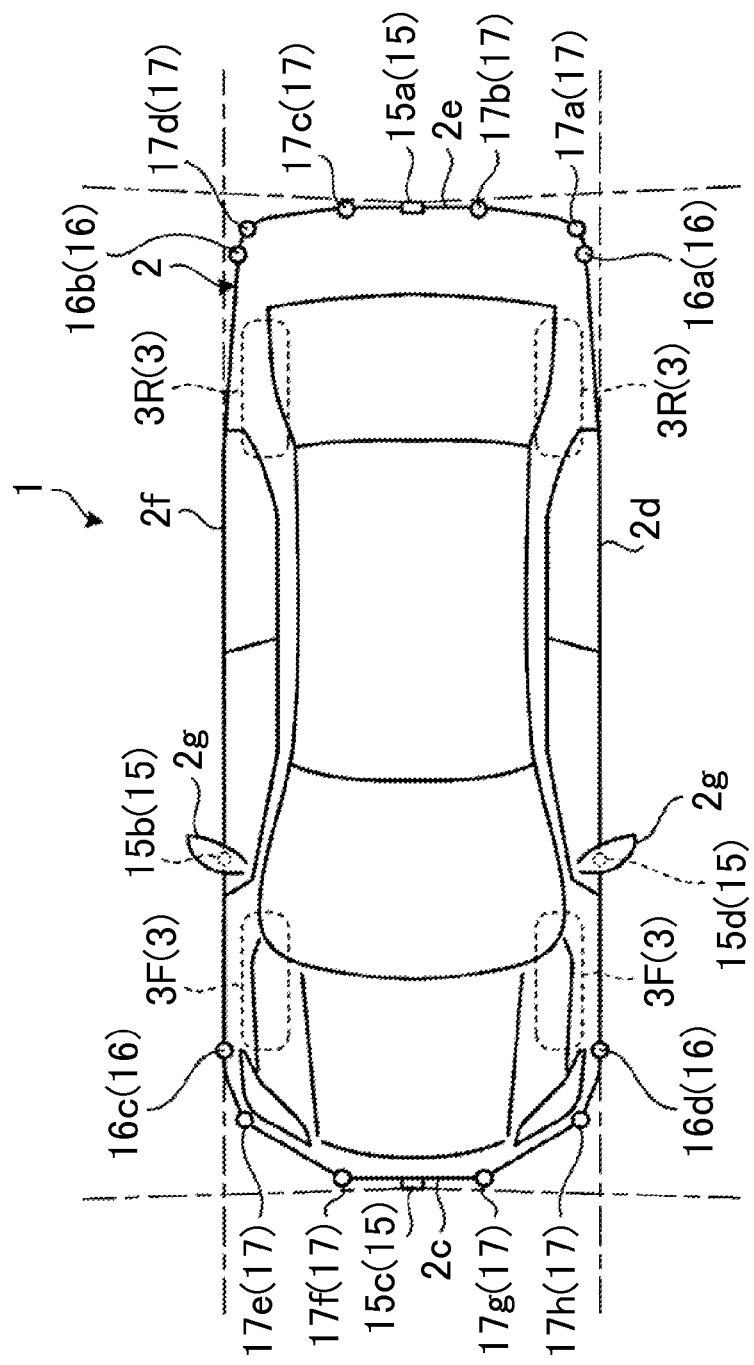
FIG. 2 is an exemplary plan view (bird's-eye view) of the vehicle according to the embodiment.
Figure 4:
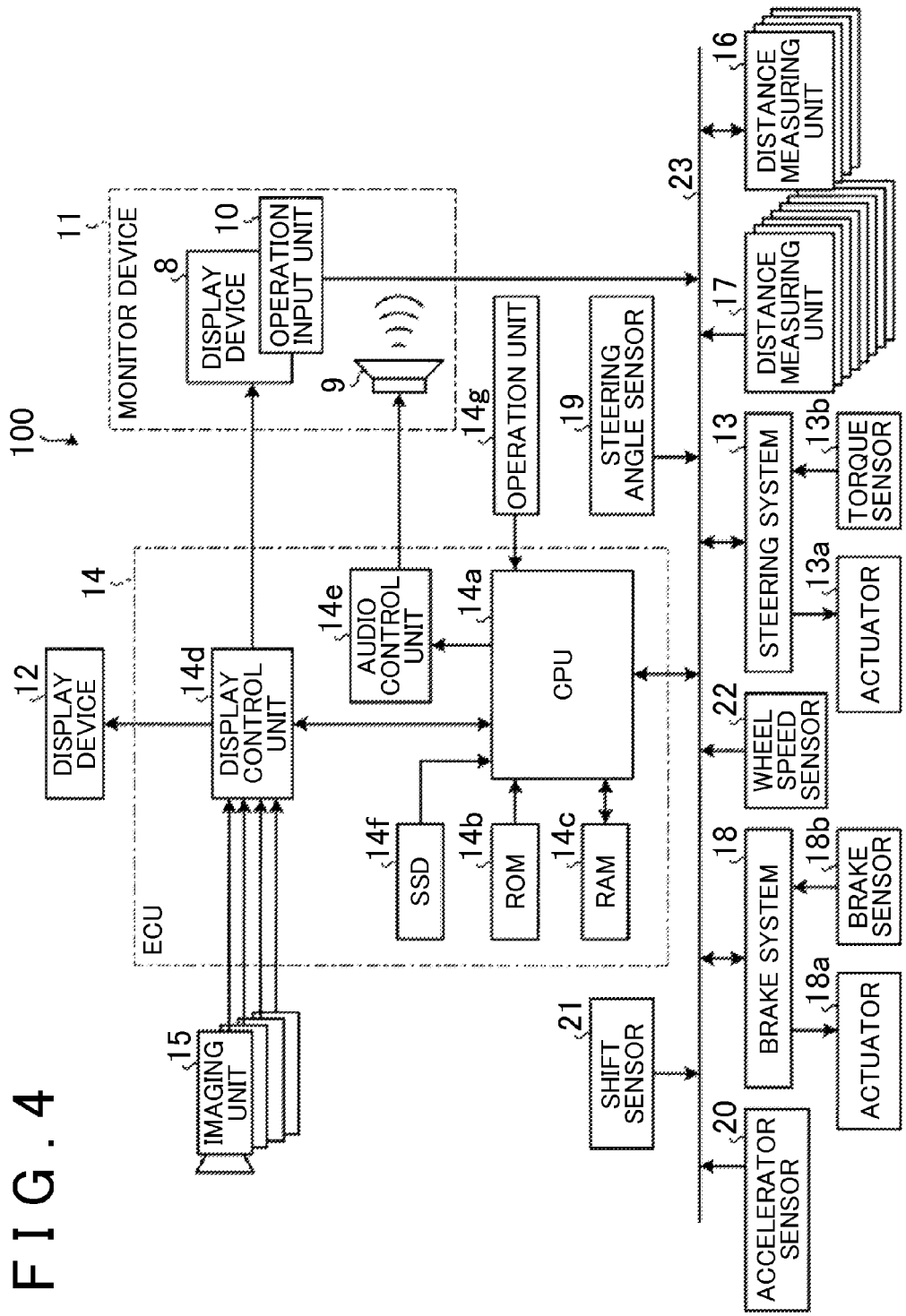
FIG. 4 is an exemplary block diagram of the configuration of a parking assist system according to the embodiment.

As illustrated in FIG. 1 and FIG. 2, the vehicle 1 is, for example a four-wheel vehicle, and includes two right and left front wheels 3F and two right and left rear wheels 3R. Each of these four wheels 3 may be steerable. As illustrated in FIG. 4, the vehicle 1 includes a steering system 13 that steers at least two of the wheels 3. The steering system 13 includes an actuator 13a and a torque sensor 13b. The steering system 13 is electrically controlled by an electronic control unit (ECU) 14, or the like, to actuate the actuator 13a. The steering system 13 is, for example, an electric power steering system, a steer-by-wire (SBW) system, or the like. The steering system 13 adds torque, that is, assist torque, to the steering unit 4 with the use of the actuator 13a to compensate for steering force, or steers the wheels 3 with the use of the actuator 13a. In this case, the actuator 13a may steer one of the wheels 3 or may steer a plurality of the wheels 3. The torque sensor 13b, for example, detects a torque that is applied to the steering unit 4 by a driver.

As illustrated in FIG. 2, for example, four imaging units 15a to 15d are provided on the vehicle body 2 as a plurality of imaging units 15. Each of the imaging units 15 is, for example, a digital camera that incorporates an imaging device, such as a charge coupled device (CCD) and a CMOS image sensor (CIS). Each of the imaging units 15 is able to output moving image data at a predetermined frame rate. Each of the imaging units 15 has a wide angle lens or a fisheye lens, and is able to capture an image in, for example, the range from 140° to 190° in the horizontal direction. The optical axis of each of the imaging units 15 is set so as to be oriented obliquely downward. Thus, each of the imaging units 15 sequentially captures an outside environment around the vehicle body 2, including a road surface on which the vehicle 1 is allowed to move and an area in which the vehicle 1 is allowed to be parked, and outputs the captured image as captured image data.

The imaging unit 15a is, for example, located at a rear end 2e of the vehicle body 2, and is provided at a lower wall portion of a door 2h of a rear boot (rear trunk). The imaging unit 15b is, for example, located at a right-side end 2f of the vehicle body 2, and is provided at a right-side door minor 2g. The imaging unit 15c is, for example, located at the front of the vehicle body 2, that is, a front end 2c in the vehicle longitudinal direction, and is provided at a front bumper, or the like. The imaging unit 15d is, for example, located at the left side of the vehicle body 2, that is, a left-side end 2d in the vehicle width direction, and is provided at a door minor 2g that serves as a left-side projecting portion. The ECU 14 is able to generate an image having a wider viewing angle or generate an imaginary bird's-eye image of the vehicle 1 from above by executing operation processing and image processing on the basis of the image data obtained by the imaging units 15. A bird's-eye image may be referred to as plan image.

The ECU 14 identifies partition lines, or the like, on a road surface around the vehicle 1 from the images of the imaging units 15, and detects (extracts) parking spaces indicated by the partition lines, or the like.

As illustrated in FIG. 1 and FIG. 2, for example, four distance measuring units 16a to 16d and eight distance measuring units 17a to 17h are provided on the vehicle body 2 as a plurality of distance measuring units 16, 17. Each of the distance measuring units 16, 17 is, for example, a sonar that emits ultrasonic wave and captures the reflected wave. The sonar may also be referred to as a sonar sensor or an ultrasonic detector. The ECU 14 is able to detect whether there is an object, such as an obstacle, located around the vehicle 1 or measure a distance to the object on the basis of the detection results of the distance measuring units 16, 17. That is, each of the distance measuring units 16, 17 is an example of a detection unit that detects an object. Each of the distance measuring units 17 may be, for example, used to detect an object at a relatively close distance. Each of the distance measuring units 16 may be, for example, used to detect an object at a relatively long distance, which is distant from an object that each of the distance measuring units 17 detects. The distance measuring units 17 may be, for example, used to detect an object ahead of or behind the vehicle 1. The distance measuring units 16 may be, for example, used to detect an object to the side of the vehicle 1.

As illustrated in FIG. 4, in a parking assist system 100, in addition to the ECU 14, the monitor device 11, the steering system 13, the distance measuring units 16, 17, and the like, a brake system 18, a steering angle sensor 19, an accelerator sensor 20, a shift sensor 21, a wheel speed sensor 22, and the like, are electrically connected to one another via an in-vehicle network 23 that serves as an electric communication line. The in-vehicle network 23 is, for example, provided as a controller area network (CAN). The ECU 14 is able to control the steering system 13, the brake system 18, and the like, by transmitting control signals through the in-vehicle network 23. The ECU 14 is able to receive detection results of the torque sensor 13b, a brake sensor 18b, the steering angle sensor 19, the distance measuring units 16, the distance measuring units 17, the accelerator sensor 20, the shift sensor 21, the wheel speed sensor 22, and the like, and operation signals of the operation input unit 10, and the like, via the in-vehicle network 23.

The ECU 14, for example, includes a central processing unit (CPU) 14a, a read only memory (ROM) 14b, a random access memory (RAM) 14c, a display control unit 14d, an audio control unit 14e, a solid state drive or flash memory (SSD) 14f, and the like. The CPU 14a is, for example, able to execute various operation processing and control, such as image processing related to images that are displayed on the display devices 8, 12, determination of a target position of the vehicle 1, calculation of a moving path of the vehicle 1, determination as to whether there is an interference with an object, automatic control over the vehicle 1, and cancellation of automatic control. The CPU 14a is able to read a program installed and stored in a nonvolatile storage device, such as the ROM 14b, and execute operation processing in accordance with the program. The RAM 14c temporarily stores various pieces of data that are used for operation processing in the CPU 14a. The display control unit 14d mainly executes image processing by the use of image data obtained by the imaging units 15, synthesis of image data that are displayed on the display device 8, and the like, within the operation processing in the ECU 14. The audio control unit 14e mainly processes audio data that are output from the audio output device 9 within the operation processing in the ECU 14. The SSD 14f is a rewritable nonvolatile storage unit, and is able to store data even when the power of the ECU 14 is turned off. The CPU 14a, the ROM 14b, the RAM 14c, and the like, may be integrated within the same package. The ECU 14 may be formed of another logical operation processor, such as a digital signal processor (DSP), a logical circuit, or the like, instead of the CPU 14a. A hard disk drive (HDD) may be provided instead of the SSD 14f. The SSD 14f or the HDD may be provided separately from the ECU 14. The ECU 14 is an example of an electronic control unit of a parking assist system.

The brake system 18 is, for example, an anti-lock brake system (ABS) that prevents the brake from locking up the wheels, a side slip prevention device (electronic stability control (ESC)) that prevents a side slip of the vehicle 1 during cornering, an electric brake system that enhances brake force (performs brake assist), a brake-by-wire (BBW), or the like. The brake system 18 imparts braking force to the wheels 3 and thus the vehicle 1, via the actuator 18a. The brake system 18 is able to execute various controls by detecting locking up of the wheels by the brake, a spin of the wheels 3, a sign of a side slip, and the like, from, for example, a rotation difference between the right and left wheels 3. The brake sensor 18b is, for example, a sensor that detects the position of a movable unit of the brake operation unit 6. The brake sensor 18b is able to detect the position of the brake pedal that serves as the movable unit. The brake sensor 18b includes a displacement sensor.

The steering angle sensor 19 is, for example, a sensor that detects a steering amount of the steering unit 4, such as the steering wheel. The steering angle sensor 19 is, for example, provided by using a Hall element, or the like. The ECU 14 acquires a driver's steering amount of the steering unit 4, a steering amount of each wheel 3 during automatic steering, or the like, from the steering angle sensor 19, and executes various controls. The steering angle sensor 19 detects a rotation angle of a rotating portion included in the steering unit 4. The steering angle sensor 19 is an example of an angle sensor.

The accelerator sensor 20 is, for example, a sensor that detects the position of a movable unit of the accelerator operation unit 5. The accelerator sensor 20 is able to detect the position of the accelerator pedal that serves as the movable unit. The accelerator sensor 20 includes a displacement sensor.

The shift sensor 21 is, for example, a sensor that detects the position of a movable unit of the shift operation unit 7. The shift sensor 21 is able to detect the position of a lever, an arm, a button, or the like, that serves as the movable unit. The shift sensor 21 may include a displacement sensor or may be provided as a switch.

The wheel speed sensor 22 is a sensor that detects a rotation amount or rotation speed of each wheel 3 per unit time. The wheel speed sensor 22 outputs a wheel speed pulse number, indicating the detected rotation speed, as a sensor value. The wheel speed sensor 22 may be, for example, formed by using a Hall element, or the like. The ECU 14 calculate a moving amount, and the like, of the vehicle 1 on the basis of the sensor value acquired from the wheel speed sensor 22, and executes various controls. There is a case where the wheel speed sensor 22 is provided in the brake system 18. In this case, the ECU 14 acquires the detection result of the wheel speed sensor 22 via the brake system 18.

The configurations, arrangement, electrical connection modes, and the like, of the above-described various sensors and actuators are illustrative, and may be variously set (changed).

Figure 5:
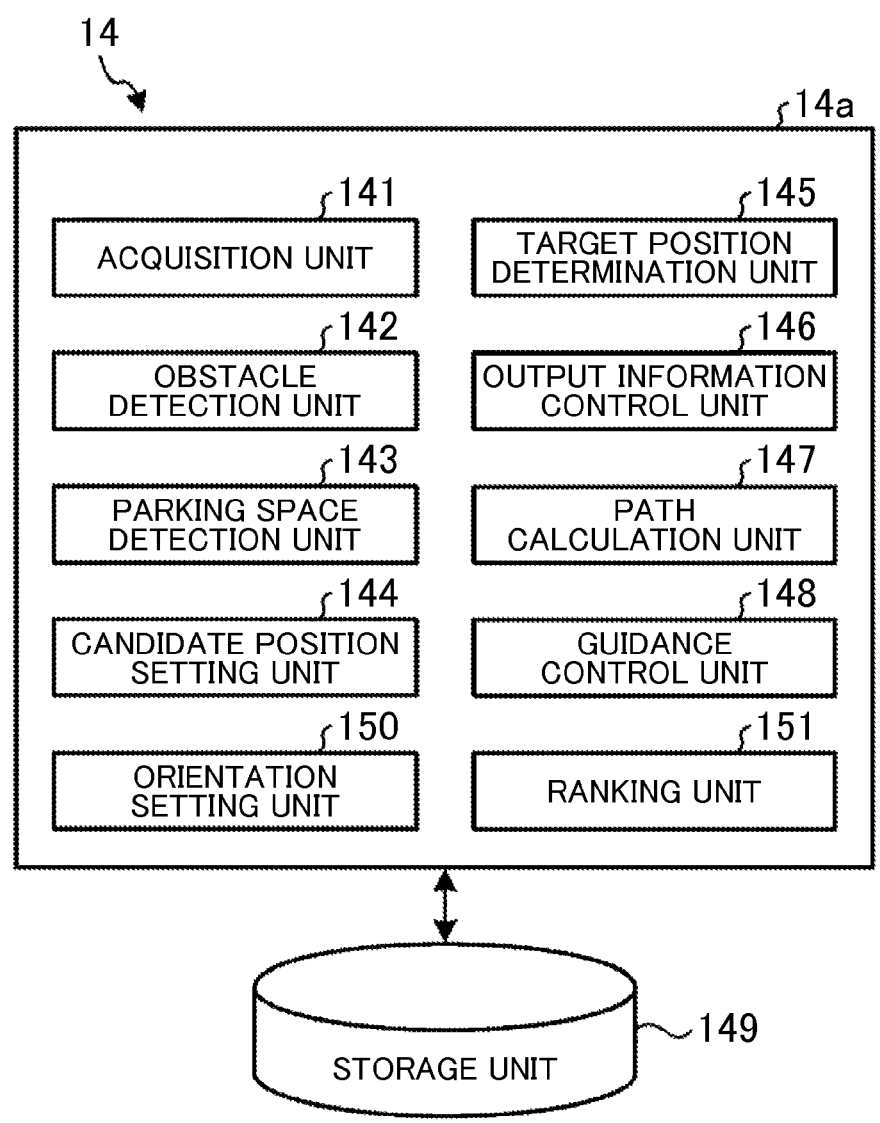
FIG. 5 is an exemplary block diagram of the configuration of part of an ECU of the parking assist system according to the embodiment.

As shown in FIG. 5, the ECU 14 includes an acquisition unit 141, an obstacle detection unit 142, a parking space detection unit 143, a candidate position setting unit 144, a target position determination unit 145, an output information control unit 146, a path calculation unit 147, a guidance control unit 148, an orientation setting unit 150, a ranking unit 151, a storage unit 149, and the like. The CPU 14a functions as the acquisition unit 141, the obstacle detection unit 142, the parking space detection unit 143, the candidate position setting unit 144, the target position determination unit 145, the output information control unit 146, the path calculation unit 147, the guidance control unit 148, the orientation setting unit 150, the ranking unit 151, or the like, by executing a process in accordance with a corresponding program. Data that are used in operation processes of the units, data of results in operation processes, and the like, are stored in the storage unit 149. At least part of the functions of the above-described units may be implemented by hardware.

The acquisition unit 141 acquires various pieces of data, signal, and the like. The acquisition unit 141, for example, acquires data, signals, and the like, such as detection results of the sensors, operation inputs, command inputs, and image data. The acquisition unit 141 is able to acquire a signal from the operation unit 14g resulting from an operation input. The operation unit 14g is, for example, a push button, a switch, or the like.

The obstacle detection unit 142 detects an obstacle that interferes with traveling of the vehicle 1. The obstacle is, for example, another vehicle, a wall, a pole, a fence, a protrusion, a step, a sprag, an object, or the like. The obstacle detection unit 142 is able to detect whether there is an obstacle, the height of an obstacle, the size of an obstacle, and the like, by the use of various techniques. The obstacle detection unit 142 is, for example, able to detect an obstacle on the basis of detection results of the distance measuring units 16, 17. Each of the distance measuring units 16, 17 is able to detect an object corresponding to the height of its beam and is not able to detect an object lower than the height of the beam. Thus, the obstacle detection unit 142 is able to detect the height of an obstacle on the basis of the detection results of the distance measuring units 16, 17 and the heights of beams of the distance measuring units 16, 17. The obstacle detection unit 142 may detect whether there is an obstacle or the height of an obstacle on the basis of a detection result of the wheel speed sensor 22 or an acceleration sensor (not shown) and detection results of the distance measuring units 16, 17. The obstacle detection unit 142 may, for example, detect the height of an obstacle through image processing based on images captured by the imaging units 15.

The parking space detection unit 143 detects a parking space that is provided as a mark or an object. The parking space is a space provided as a target or reference set for parking the vehicle 1 in that place. A parking boundary is a boundary or outer periphery of the parking space, and is, for example, a partition line, a frame line, a straight line, a band, a step, an edge of any one of them, or the like. That is, the parking boundary is a mark, an object, or the like. The parking space detection unit 143 is, for example, able to detect a parking space and a parking boundary through image processing based on images captured by the imaging units 15. The parking space detection unit 143 is an example of a parking boundary detection unit.

The candidate position setting unit 144 sets at least one candidate position that is a candidate for a target position, that is, a terminal position of a moving path of the vehicle 1. The candidate position setting unit 144, for example, sets a candidate position on the basis of at least one of a detection result of the obstacle detection unit 142 and a detection result of the parking space detection unit 143.

The orientation setting unit 150 sets the orientation of the vehicle 1 (candidate position vehicle orientation) at each candidate position. The orientation setting unit 150, for example, sets the orientation of the vehicle 1 at a candidate position on the basis of at least one of a detection result of the obstacle detection unit 142 and a detection result of the parking space detection unit 143. When a parking space has been detected, the orientation setting unit 150 sets the orientation on the basis of the parking space.

The ranking unit 151 ranks each candidate position. The ranking unit 151 ranks each candidate position on the basis of, for example, the current position and orientation of the vehicle 1 (host vehicle), the candidate position and the orientation of the candidate position. Ranking means sequencing, and assigning a number, or the like, indicating a rank, to each candidate position is not indispensable. The ranking unit 151 may set a numeric value corresponding to each candidate position, and may allow identification of a rank on the basis of the magnitude of the numeric value.

The target position determination unit 145 determines a target position from among at least one candidate position. The target position determination unit 145 is, for example, able to determine a high-rank candidate position, that is, an upper-level candidate position, as a target position, from among at least one candidate position ranked by the ranking unit 151. The target position determination unit 145 is, for example, able to determine a candidate position corresponding to an occupant's operation input, that is, a candidate position selected by the occupant, as a target position from among at least one candidate position.

The output information control unit 146 controls, for example, the display control unit 14d or the audio control unit 14e, and then the display device 8, the display device 12 or the audio output device 9, such that the display device 8, the display device 12 or the audio output device 9 outputs intended information in an intended mode at each of steps, such as a start of parking assist, an end of parking assist, determination of a target position, calculation of a path and guidance control.

The path calculation unit 147, for example, calculates a moving path from the current position of the vehicle 1 to the target position on the basis of the current position of the vehicle 1, that is, the host vehicle, the determined target position, a result of detection of an obstacle, and the like.

The guidance control unit 148 controls the portions of the vehicle 1 such that the vehicle 1 moves along the calculated moving path. In the vehicle 1 that moves without operating the accelerator pedal, such as when in a creeping mode, the guidance control unit 148 is, for example, able to move the vehicle 1 along the moving path by controlling the steering system 13 in response to the position of the vehicle 1. The guidance control unit 148 may control not only the steering system 13 but also a drive mechanism, such as an engine and a motor, the brake system 18 that serves as a braking mechanism, or the like. The guidance control unit 148 may, for example, inform the driver of movement of the vehicle 1 along the moving path through display output or audio output commensurate with the position of the vehicle 1 by controlling the output information control unit 146, the display control unit 14d or the audio control unit 14e, and then the display device 8, the display device 12 or the audio output device 9.

The storage unit 149 stores data that are used in operation processing in the ECU 14 or data calculated in operation processing in the ECU 14.

Figure 6:
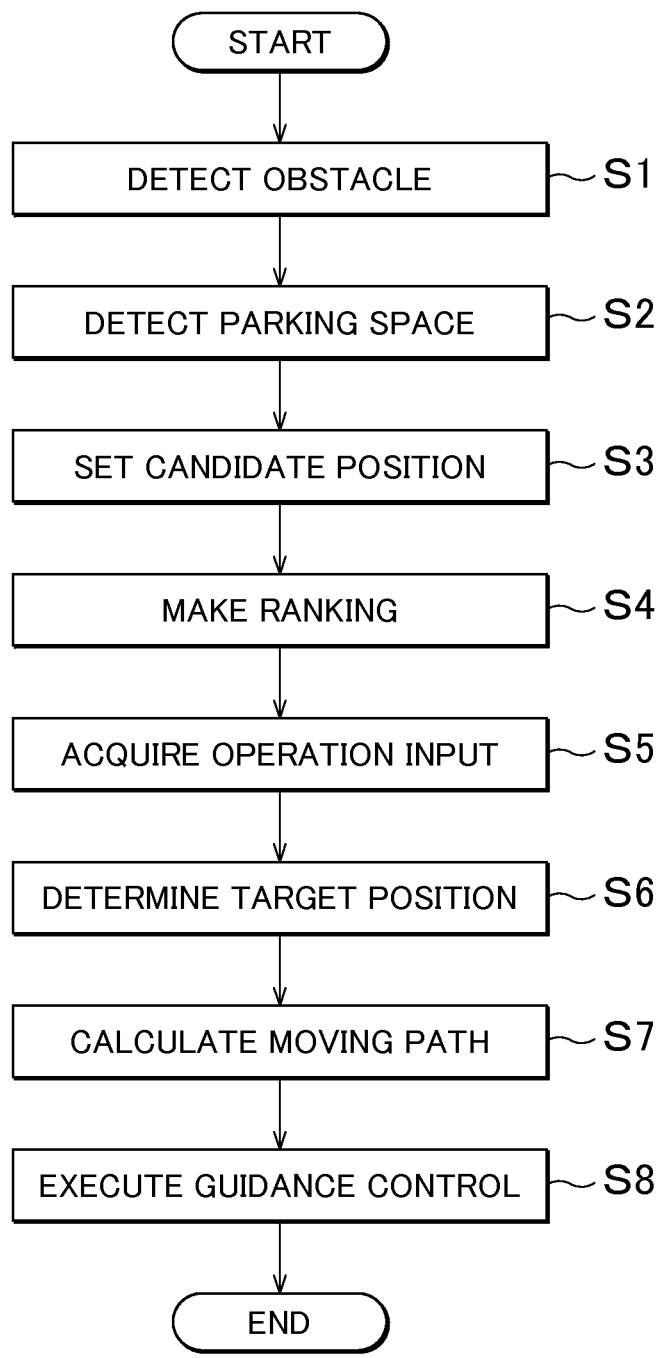
FIG. 6 is a flowchart that shows an example of the procedure of a process that is executed by the parking assist system according to the embodiment.

In the parking assist system 100, a process is executed in accordance with the procedure illustrated in FIG. 6. Initially, the obstacle detection unit 142 detects an obstacle (S1), and the parking space detection unit 143 detects a parking space and a parking boundary (S2). Subsequently, the candidate position setting unit 144 sets at least one candidate position that is a candidate for a target position, that is, terminal position, of the moving path of the vehicle 1 on the basis of the detection results in S1 and S2 (S3). Subsequently, the ranking unit 151 ranks each candidate position (S4). Subsequently, the acquisition unit 141 acquires an operation input that indicates a command to start parking assist (S5). That is, in the present embodiment, for example, before a start command is input, S1 to S4 are executed. Subsequently, the target position determination unit 145 determines a target position from among at least one candidate position (S6). In S6, the target position determination unit 145 is able to determine the highest-rank candidate position as the target position. Alternatively, the target position determination unit 145 may determine a candidate position, selected on the basis of an occupant's operation input, as the target position. Subsequently, the path calculation unit 147 calculates a moving path from the current position of the vehicle 1 to the determined target position (S7). Subsequently, the guidance control unit 148 controls the portions of the vehicle 1 such that the vehicle 1 moves along the calculated moving path (S8). The target position, the moving path, or the like, may be corrected or updated as needed in the middle of movement of the vehicle 1 along the moving path.

Figure 7:
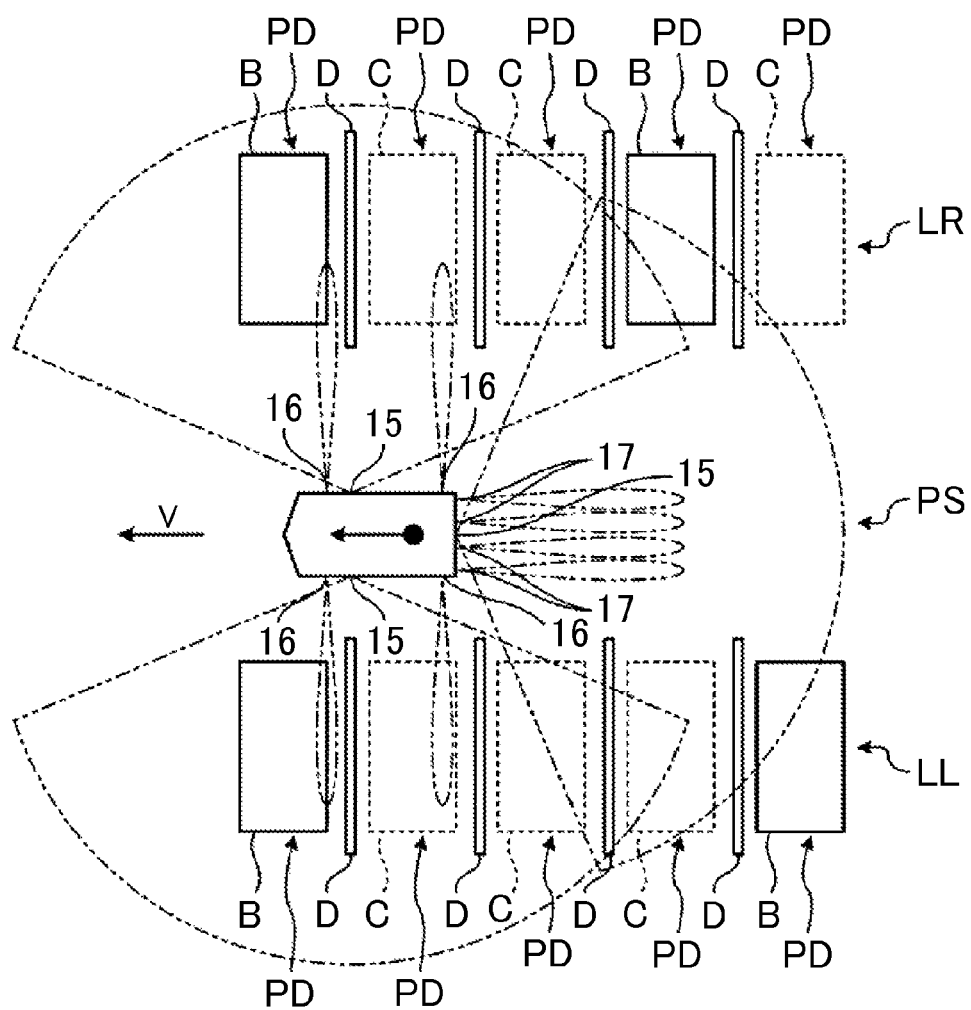
FIG. 7 is a schematic and exemplary plan view that shows an example of a parking place to which the parking assist system according to the embodiment is applicable.

Next, an example of a method of setting a candidate position C by the candidate position setting unit 144 according to the present embodiment will be described with reference to FIG. 7 and FIG. 8. FIG. 7 is a plan view of an example of a parking place in which two rows LR, LL of parking spaces PD for side-by-side parking in which vehicles are parked side by side are provided. In this example, the vehicle 1 enters a vacant parking space PD from a passage PS between the two rows LR, LL. Each of the parking spaces PD of the two rows LR, LL and its entrance face the passage PS. The vehicle 1 is parked in one of the parking spaces PD in position in which the vehicle 1 is oriented in a direction that intersects with a traveling direction V of the vehicle 1. The parking assist system 100 assists in moving the vehicle backward to a target position set in a vacant parking space PD. The target position is determined from among at least one candidate position. In order to facilitate determination of the target position, each candidate position is ranked. Each parking space PD is defined by parking boundaries D that are marks or objects. Obstacles B are, for example, vehicles, or the like, parked in the corresponding parking spaces PD.

As illustrated in FIG. 7, while the vehicle 1 is passing through a passage
PS, the ECU 14 is able to detect obstacles B, parking boundaries D, and the like, located to the side or rear side of the vehicle 1, on the basis of image data captured by the imaging units 15 and detection results of the distance measuring units 16, 17. FIG. 7 illustrates captured ranges of the imaging units 15 and detected ranges of the distance measuring units 16, 17 by the alternate long and two-short dashes lines; however, these are illustrative. The imaging units 15, the captured ranges, the distance measuring units 16, 17 and the detected ranges are not limited to the example shown in FIG. 7. In FIG. 7 and the subsequent drawings, the arrow that indicates the forward side in the vehicle longitudinal direction is affixed to the vehicle 1; however, the arrow does not always indicate the traveling direction. The distance measuring units 17 are able to obtain detection results at the time when the vehicle 1 turns or reverses. The vehicle 1 may be referred to as host vehicle.

Figure 8:
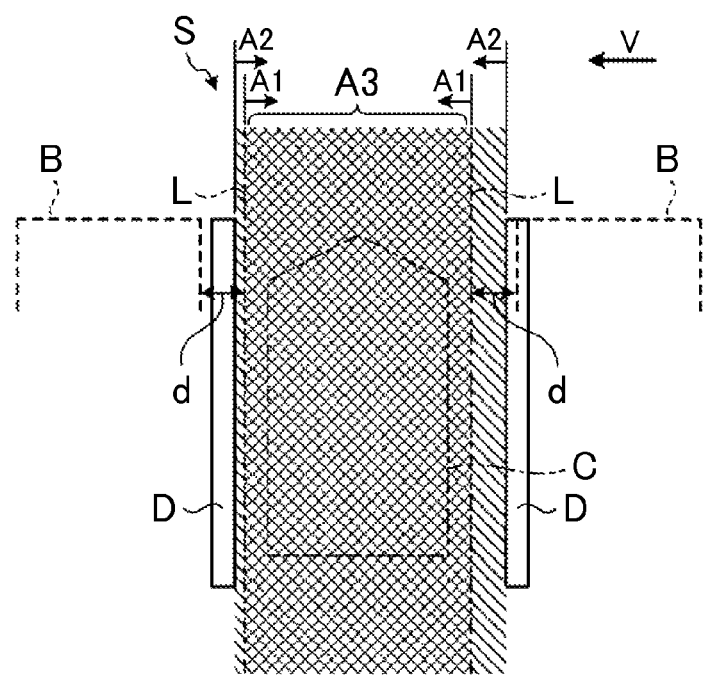
FIG. 8 is a schematic and exemplary plan view that shows an example of obstacles and parking boundaries detected by the parking assist system, and a candidate position set by the parking assist system according to the embodiment.

FIG. 8 illustrates a detection result of the parking assist system 100 of the vehicle 1 that travels in the traveling direction V. In a space S, mutually spaced two obstacles B and mutually spaced two parking boundaries D are detected. A limit line L of each obstacle B is set at a position spaced a predetermined distance d from the outer periphery of the corresponding obstacle B substantially along the outer periphery of the corresponding obstacle B. In this case, for example, on the basis of the obstacles B and the parking boundaries D detected in the space S, the candidate position setting unit 144 determines whether a candidate position C is allowed to be set in an area A3 in which an area A1 on a side across each limit line L from the corresponding obstacle B and an area A2 outside of the parking boundaries D overlap with each other. By setting a candidate position C in the area A1, at least the predetermined distance d, that is, a clearance, is provided between each obstacle B and the vehicle 1 located at the candidate position C. By setting a candidate position C in the area A2, a situation in which the vehicle 1 overlaps with one of the parking boundaries D is avoided. Thus, according to this example, the candidate position setting unit 144 is able to set a candidate position C to a position that is spaced apart from the obstacle B and that falls within the parking space PD.

Figure 9:
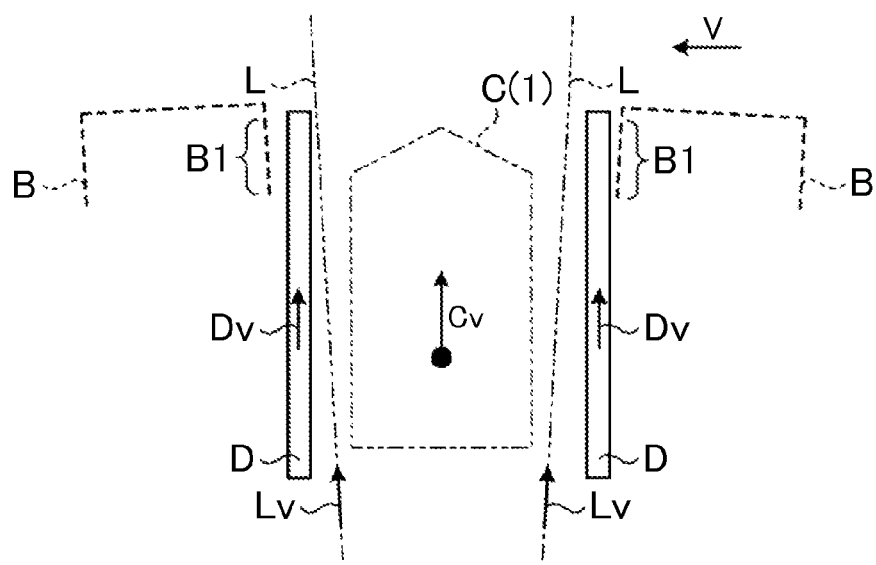
FIG. 9 is a schematic and exemplary plan view that shows another example of obstacles and parking boundaries detected by the parking assist system, and a candidate position set by the parking assist system according to the embodiment.

FIG. 9 shows an example of setting of an orientation Cv, to which the vehicle 1 is oriented at the candidate position C, by the orientation setting unit 150 in the case where mutually spaced two obstacles B and mutually spaced two parking boundaries D are detected. The orientation Cv is, for example, the forward side of the vehicle 1 located at the candidate position C. A direction Dv in which each parking boundary D extends is, for example, obtained through regression analysis, such as a method of least squares, on each detected parking boundary D. The limit lines L and the parking boundaries D extend in a direction that intersects with the traveling direction V of the traveling vehicle 1. In this case, the orientation setting unit 150, for example, sets the orientation Cv to an orientation between the directions Dv in which the two parking boundaries D respectively extend. For example, when angles of the directions Dv with respect to a reference direction are $\alpha 1, \alpha 2$, an angle $\beta$ of the orientation Cv with respect to the reference direction is set to $(\alpha 1+\alpha 2)/2$. When one parking boundary D has been detected, the orientation setting unit 150 sets the orientation Cv to a direction parallel to the direction Dv in which the one parking boundary D extends. When no parking boundary D has been detected, the orientation setting unit 150 sets the orientation Cv to a direction between directions Lv of two limit lines L or a direction parallel to a direction Lv of one limit line L.

Figure 10:
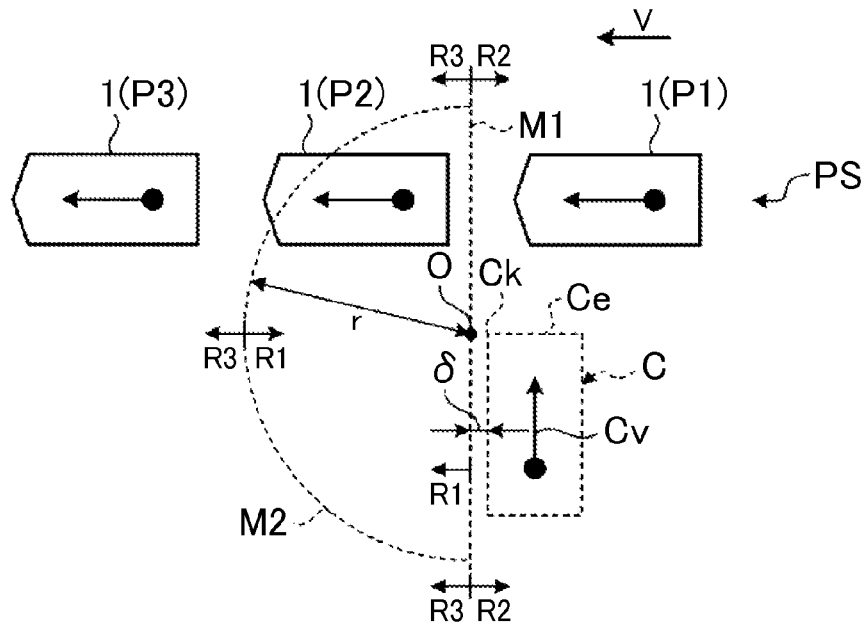
FIG. 10 is a schematic and exemplary plan view of the set ranked areas corresponding to one candidate position in the parking assist system according to the embodiment.

FIG. 10 illustrates a plurality of the set ranked areas R1 to R3 corresponding to each candidate position C. In the example shown in FIG. 10, the ranked area R2 is set so as to face the front of the candidate position C, that is, the entrance of the parking space PD. The rank of the ranked area R2 is set to "2". The ranked area R1 is set on the forward side of the ranked area R2 in the traveling direction of the vehicle 1. The rank of the ranked area R1 is set to "1" higher than the rank of the ranked area R2. The ranked area R3 is set so as to be more distant from the candidate position C than the ranked area R1. The rank of the ranked area R3 is set to "3" lower than the rank of the ranked area R1 or the rank of the ranked area R2. The ranked area R1 is an example of a first area. The ranked area R2 is an example of a second area. The ranked area R3 is an example of a third area.

By such settings, as the vehicle 1 moves in the traveling direction V along the passage PS forward of the candidate position C, the rank of the candidate position C changes. That is, in the example shown in FIG. 10, in a state where the vehicle 1 is located at a position P1, the vehicle 1 is located in the ranked area R2 of the candidate position C. Thus, at time at which the vehicle 1 is located at the position P1, the rank of the candidate position C is set to "2". When the vehicle 1 travels forward from the position P1, and, in a state where the vehicle 1 is located at a position P2, the vehicle 1 is located in the ranked area R1 of the candidate position C. Thus, at time at which the vehicle 1 is located at the position P2, the rank of the candidate position C is set to "1". When the vehicle further travels forward from the position P2, and, in a state where the vehicle 1 is located at a position P3, the vehicle 1 is located in the ranked area R3 of the candidate position C. Thus, at time at which the vehicle 1 is located at the position P3, the rank of the candidate position C is set to "3". That is, as the vehicle 1 travels in front of the candidate position C, the rank changes in order of "2", "1" and "3". That is, in a state where the vehicle 1 is located in an area facing the candidate position C, the rank is the second rank. In a state where the vehicle 1 is located in an area into which the vehicle 1 travels forward from the area facing the candidate position C, the rank is the first rank. In a state where the vehicle 1 is located in an area into which the vehicle 1 further travels further forward from the area facing the candidate position C, the rank is the third rank. By such settings, a higher rank is set for each candidate position C at time at which the vehicle 1 is appropriately spaced apart from the candidate position C than at time at which the vehicle 1 is located closest to the candidate position C. When the vehicle 1 moves from a position, closest to a candidate position C, to the candidate position C, switching between forward movement and backward movement tends to increase. When the vehicle 1 is too distant from a candidate position C, a moving distance to the candidate position C becomes longer, so, for example, it may take time and trouble. Thus, by such settings of the ranked areas R1 to R3, a smoother or less inconvenient candidate position C tends to be determined as the target position.

The ranked areas R1 to R3 are set on the basis of the candidate position C and the orientation Cv of the candidate position C. Specifically, in the example shown in FIG. 10, a reference point O is set at a position spaced a predetermined distance δ in the traveling direction V from an end Ck of an entrance portion Ce in the traveling direction V of the vehicle 1. The entrance portion Ce faces the passage PS of the candidate position C. A partition line M1 that passes through the reference point O and that is parallel to the orientation Cv is set, and an area on the rear side of the partition line M1 in the traveling direction V is set for the ranked area R2. A partition line M2 having a semicircular or D shape having a radius r about the reference point O is set on the forward side to the partition line M1. An area on the forward side of the partition line M1 and the partition line M2 in the traveling direction V is set for the ranked area R3. An area surrounded by the partition line M1 and the partition line M2 is set for the ranked area R1. In the passage PS, the ranked area R1 is located on the forward side of the ranked area R2 in the traveling direction V, and the ranked area R3 is located on the forward side of the ranked area R1 in the traveling direction V. The ranked area R3 is set so as to be more distant from the candidate position C than the ranked area R1. The ranked area R1 for which the highest rank is set is set within an area in which a distance from the reference point O, that is, a distance from the entrance portion Ce of the candidate position C, is substantially shorter than or equal to a predetermined distance. FIG. 10 illustrates the case where the vehicle 1 heads leftward when viewed from the candidate position C toward the passage PS, that is, when viewed upward in FIG. 10; whereas, when the vehicle 1 heads rightward when viewed from the candidate position C toward the passage PS, ranked areas R1 to R3 that are reverse to those in FIG. 10 are set. That is, the ranked areas R1 to R3 are set in response to the traveling direction V of the vehicle 1 or the orientation of the vehicle 1. Settings of the ranked areas R1 to R3 are not limited to the example shown in FIG. 10. Raking based on the ranked areas R1 to R3 is an example of raking based on the candidate position C, the position of the vehicle 1 and the orientation of the vehicle 1. The ranked areas R1 to R3 illustrated in FIG. 10 are illustrative, and ranked areas are not limited to this example. The ranking unit 151 may calculate not the value of a rank of each ranked area but calculate the value of each candidate position C, which is derived from a condition, a mathematical expression, or the like, based on the candidate position C, the position of the vehicle 1 and the orientation of the vehicle 1 and on the basis of the magnitude of which a rank is determined.

Figure 11:
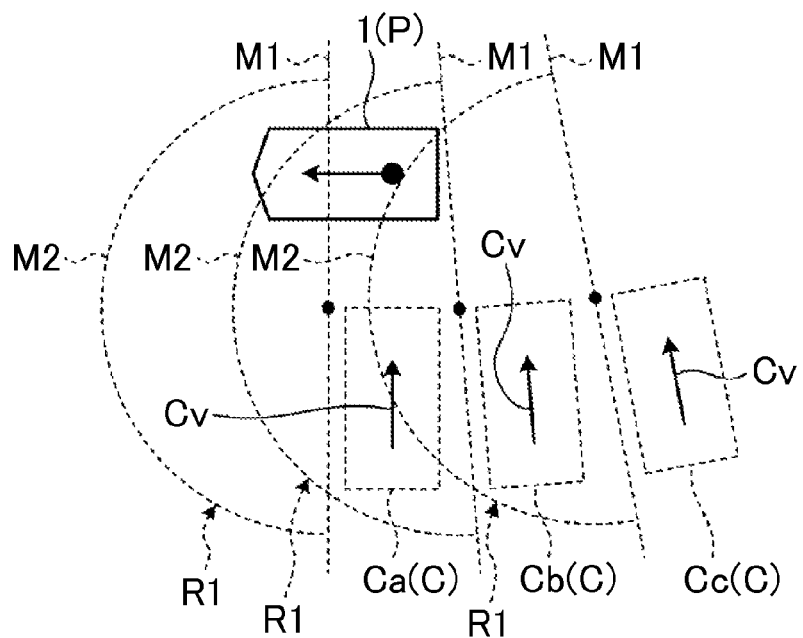
FIG. 11 is a schematic and exemplary plan view of the set ranked areas corresponding to each of a plurality of candidate positions in the parking assist system according to the embodiment.

In the example shown in FIG. 11, at time at which the vehicle 1 is located at a position P, based on the position P of the vehicle 1 with respect to the ranked areas R1 to R3, the rank of a candidate position Ca closest to the vehicle 1 is set to "2", the rank of a candidate position Cb located to the rear side of the candidate position Ca in the traveling direction V of the vehicle 1 is set to "1", and the rank of a candidate position Cc located to the rear side of the candidate position Cb in the traveling direction V of the vehicle 1 is set to "3".

It is understood from FIG. 11 that the inclination of each of the ranked areas R1 to R3 is set commensurately with the orientation Cv of a corresponding one of the candidate positions C. By such settings, the set ranked areas R1 to R3 tend to reflect easiness of moving the vehicle 1 into the candidate position C and difficulty of moving the vehicle 1 into the candidate position C. Ranking based on the ranked areas R1 to R3 is an example of ranking based on the candidate position C, the orientation of the candidate position C, the position of the vehicle 1 and the orientation of the vehicle 1. The ranked areas R1 to R3 illustrated in FIG. 11 are illustrative, and ranked areas are not limited to this example. The ranking unit 151 may calculate not the value of a rank of each ranked area but calculate the value of each candidate position C, which is derived from a condition, a mathematical expression, or the like, based on the candidate position C, the orientation Cv of the candidate position C, the position of the vehicle 1 and the orientation of the vehicle 1 and on the basis of the magnitude of which a rank is determined.

Figure 12:
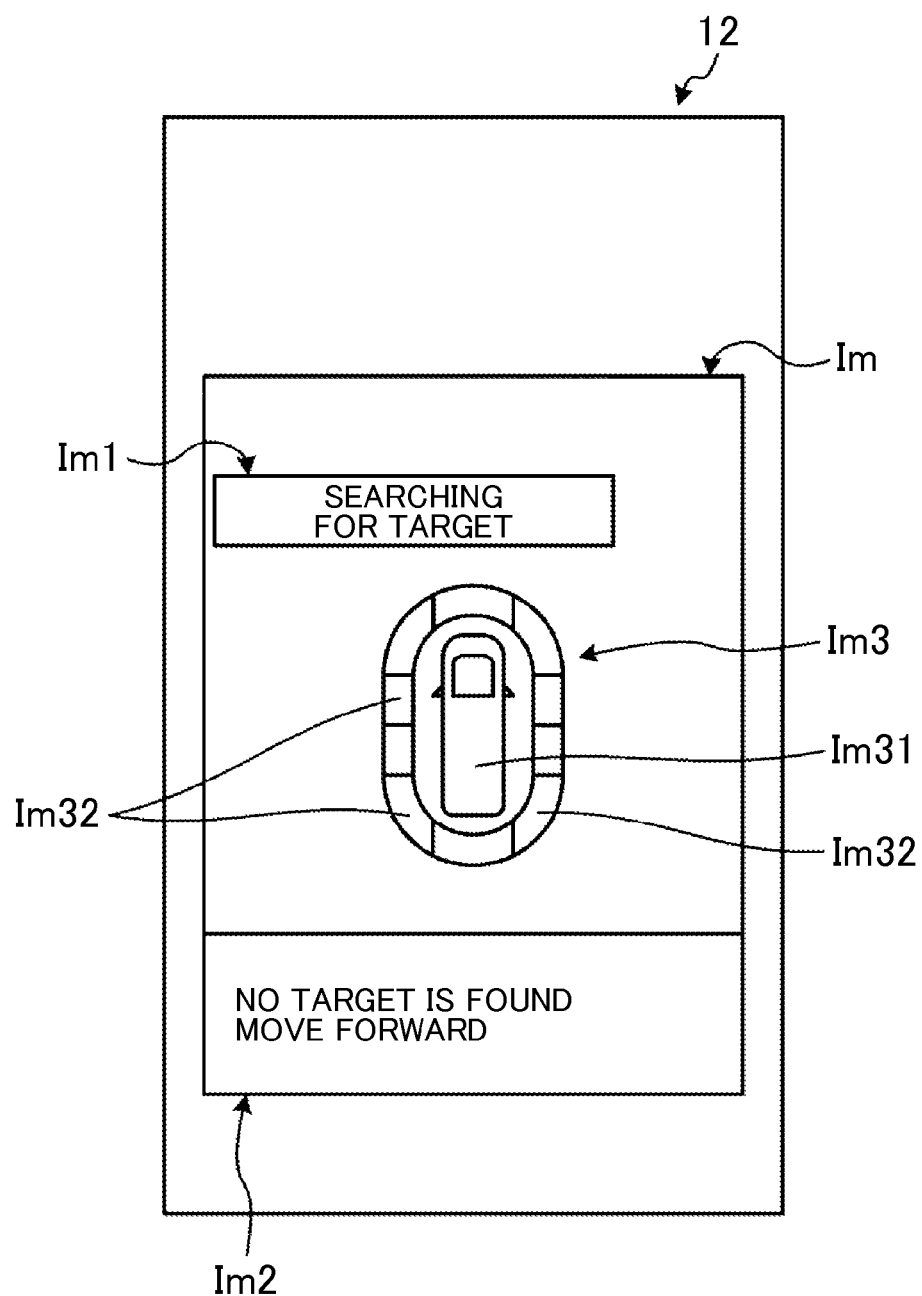
FIG. 12 is a view that shows a first example of an image that is displayed on a display device through control that is executed by the parking assist system according to the embodiment.
Figure 13:
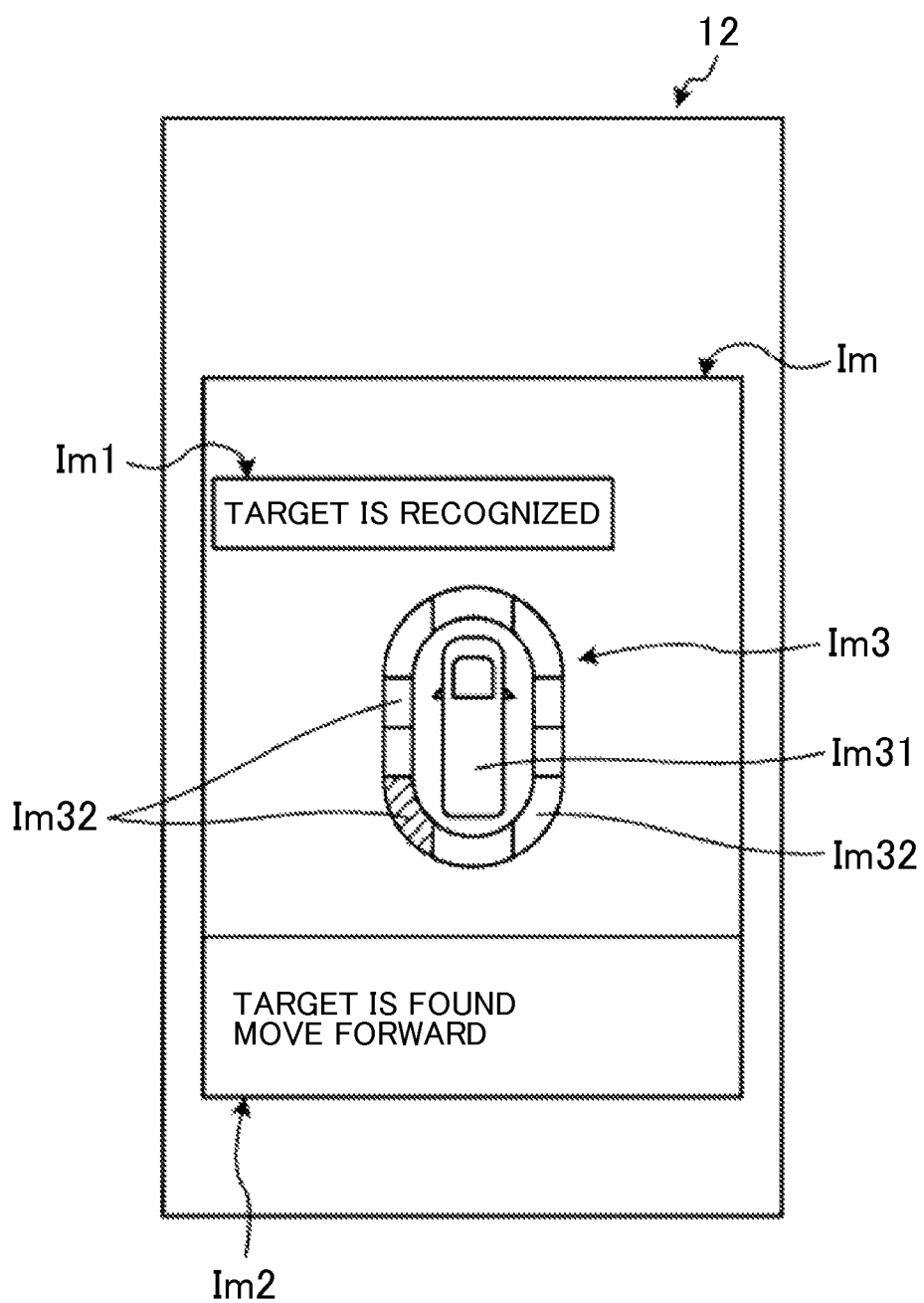
FIG. 13 is a view that shows a second example of an image that is displayed on the display device through control that is executed by the parking assist system according to the embodiment.
Figure 14:
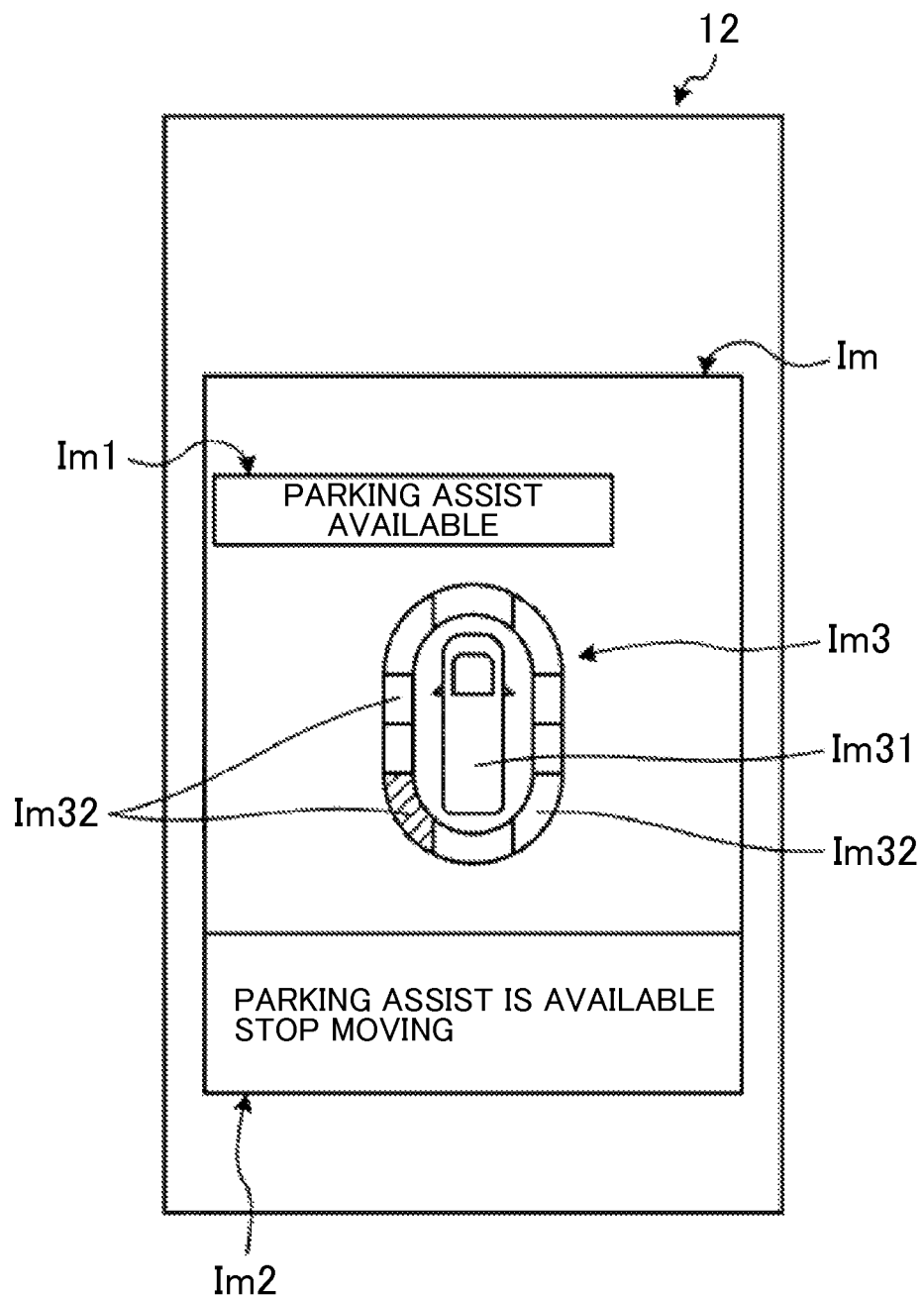
FIG. 14 is a view that shows a third example of an image that is displayed on the display device through control that is executed by the parking assist system according to the embodiment.

FIG. 12 to FIG. 14 illustrate changes of an image Im that is displayed on the display device 12 at each time at which the candidate position setting unit 144 is executing a process of setting a candidate position C while the vehicle 1 is traveling. The output information control unit 146 and display control unit 14*d* of the ECU 14 control the display device 12 such that the image Im as illustrated in FIG. 12 to FIG. 14 is displayed in response to a processing status of the candidate position setting unit 144. The image Im includes a text image Im1, a text image Im2, a symbol Im3, and the like. In the text image Im1, the outline of the processing status is shown. In the text image Im2, more specific details of the processing status are shown. In the symbol Im3, the processing status is shown by a design, a figure, a mark, or the like. FIG. 12 shows the image Im in a situation before the candidate position C is set. FIG. 13 shows the image Im in a situation in which, although a candidate position C is set, the rank of the candidate position C is "2" or in a situation in which only one candidate position C is found. FIG. 14 shows the image Im in a situation in which a candidate position C of which the rank is "1" is found. After the example of FIG. 14, when parking assist is started on the basis of a driver's operation input, or the like, the target position determination unit 145 is able to determine the candidate position C of which the rank is "1" as the target position. In the present embodiment, by settings of the above-described ranked areas R1 to R3, the rank of the candidate position C of which the rank is "2" is highly likely to change into "1" as the vehicle 1 moves. In a situation in which the image Im shown in FIG. 13 is displayed, the ECU 14 prompts the driver to move the vehicle 1 by the use of the text image Im2, and prompts the driver to stop the vehicle 1 by the use of the text image Im2 as illustrated in FIG. 14. Thus, smoother or less inconvenient guidance to the candidate position C tends to be achieved.

As illustrated in FIG. 12 to FIG. 14, the symbol Im3 includes a simulated image Im31 of the vehicle 1, a plurality of divided display sections Im32 surrounding the simulated image Im31, and the like. In the symbol Im3, the upper side of each drawing indicates the forward side of the vehicle 1. In a situation in which the candidate position C is set and the image Im of FIG. 13 or FIG. 14 is shown, for example, the display section Im32 in a direction close to a direction in which there is the candidate position C with respect to the vehicle 1 is selected and controlled to illuminate. In FIG. 13 and FIG. 14, the illuminating display section Im32 is hatched. Thus, an occupant, such as a driver, is allowed to recognize a rough direction in which the candidate position C and the target position are set with respect to the vehicle 1. The image Im is not limited to the examples shown in FIG. 12 to FIG. 14. The images Im displayed in FIG. 12 to FIG. 14 may be displayed on the display device 8.

Figure 15:
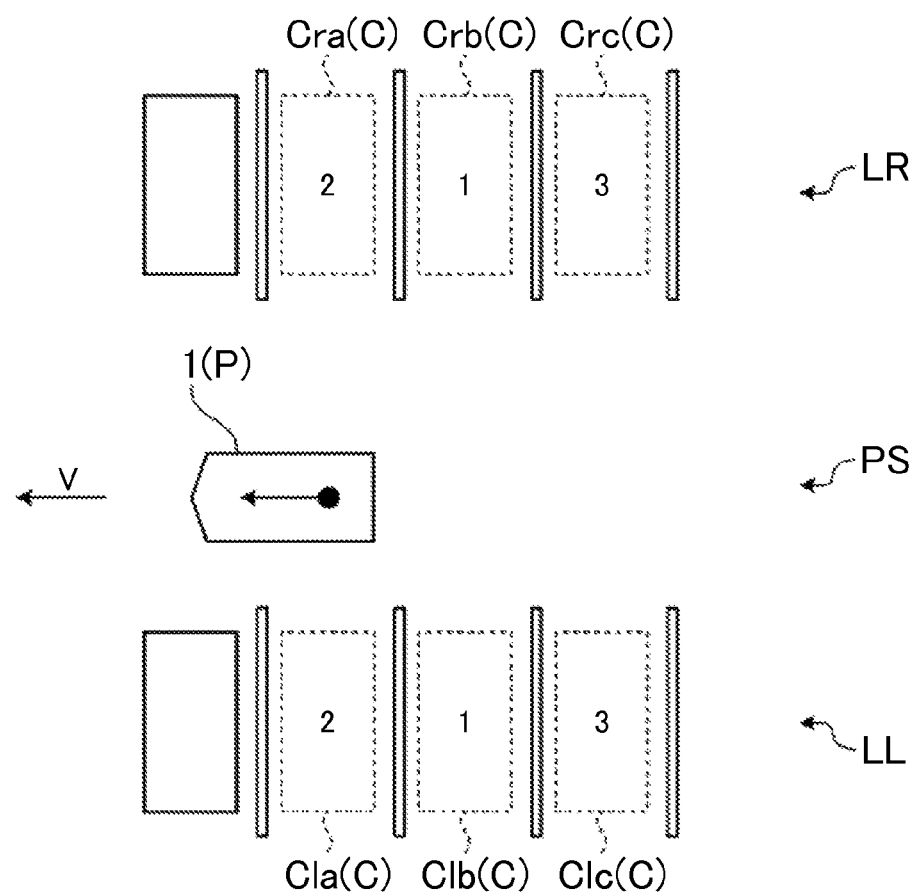
FIG. 15 is a schematic and exemplary plan view that shows a plurality of candidate positions and ranks respectively assigned to the candidate positions in the parking assist system according to the embodiment.

As illustrated in FIG. 15, the ranking unit 151 is able to rank candidate positions C in right and left rows LR, LL on both sides of the passage PS of the vehicle 1. Thus, according to ranking based on the above-described ranked areas R1 to R3, as illustrated in FIG. 15, at time at which the vehicle 1 is located at a position P, the following situation may arise. The rank of a candidate position Cra in the row LR is set to "2", the rank of a candidate position Crb in the row LR is set to "1", the rank of a candidate position Crc in the row LR is set to "3", the rank of a candidate position Cla in the row LL is set to "2", the rank of a candidate position Clb in the row LL is set to "1", and the rank of a candidate position Clc in the row LL is set to "3". That is, the rank of each of the plurality of candidate positions C, that is, the candidate position Crb and the candidate position Clb in this example, is set to "1".

Figure 16:
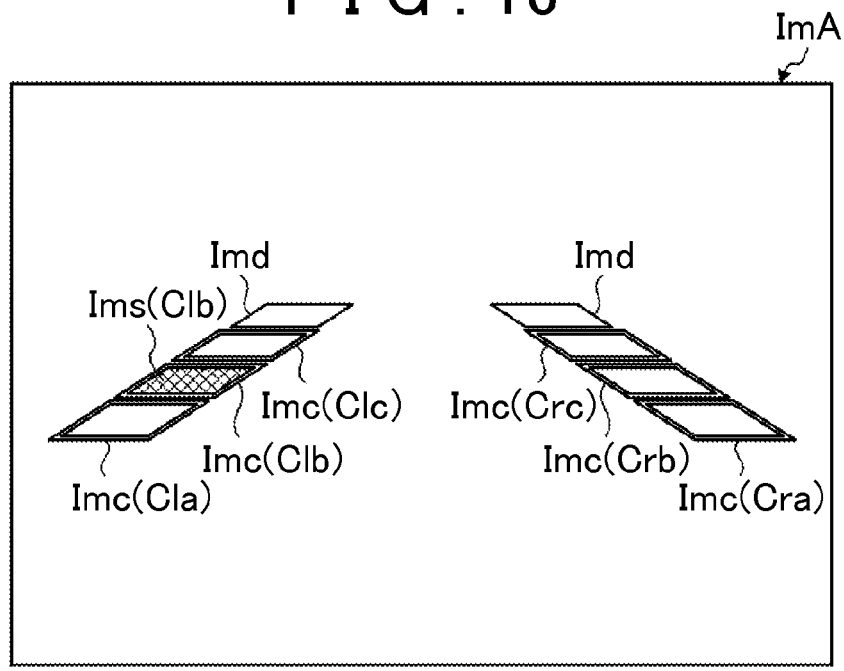
FIG. 16 is a view that shows a fourth example of an image that is displayed on the display device through control that is executed by the parking assist system according to the embodiment.
Figure 17:
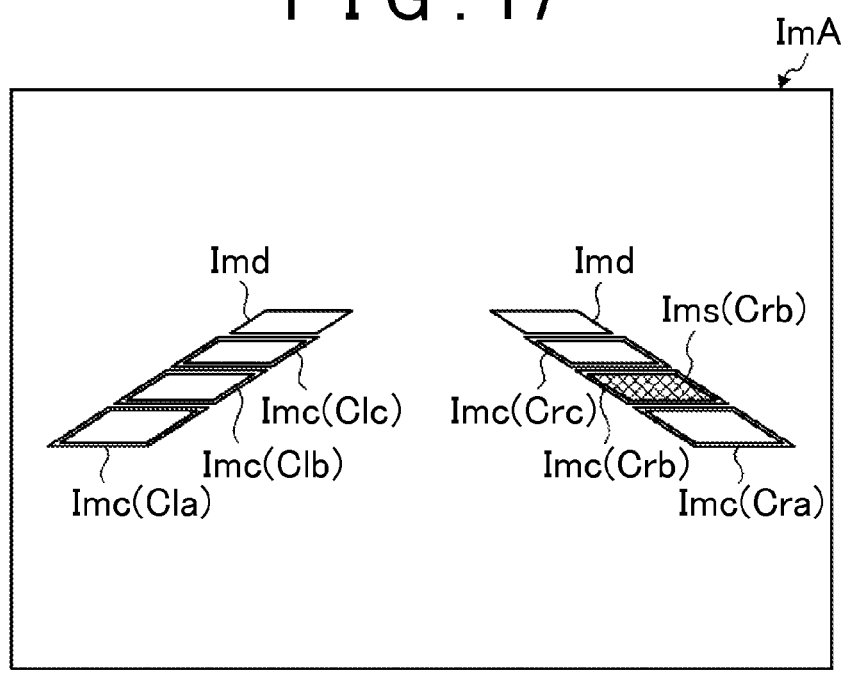
FIG. 17 is a view that shows a fifth example of an image that is displayed on the display device through control that is executed by the parking assist system according to the embodiment.

Including this case, the target position determination unit 145 is, for example, able to determine the target position from among at least one candidate position C on the basis of an operation input of an occupant, such as a driver. FIG. 16 and FIG. 17 illustrate an image ImA that is displayed on the display device 8 and that shows a plurality of candidate positions C corresponding to the case shown in FIG. 15. The image ImA is an image that includes a road surface outside the vehicle. The image ImA is an image that provides set candidate positions C, a high-rank candidate position C, a candidate position C that is allowed to be determined as the target position, and the like, and is also an image that prompts the driver to select a candidate position C. The image ImA includes images Imc, Ims corresponding to the candidate positions C. The image ImA changes as the vehicle 1 moves, and the images Imc, Ims corresponding to the candidate positions C also change. The output information control unit 146 and display control unit 14*d* of the ECU 14 control the display device 8 such that the image ImA as illustrated in FIG. 16 or FIG. 17 is displayed. The output information control unit 146 and the display control unit 14*d* are one example of an output control unit. An occupant, such as a driver, performs a predetermined operation input on the basis of the image ImA including the images Imc, Ims, displayed on the display device 8. The target position determination unit 145 is able to determine the target position from among at least one candidate position C on the basis of an input signal corresponding to the operation input. Each of the images Imc is an example of a first image, and the image Ims is an example of a second image.

In the examples shown in FIG. 16 and FIG. 17, the image ImA may be, for example, generated on the basis of a rear image of the vehicle 1, captured by the imaging unit 15*a* illustrated in FIG. 1 and FIG. 2. In this case, the image ImA is generated on the basis of an image inverted in the right-left direction from the image captured by the imaging unit 15*a* such that the image agrees with the orientation of the vehicle 1 in the position of the driver who watches the display device 8 located forward, that is, the left side of the viewing angle is the right side of the vehicle 1 and the right side of the viewing angle is the left side of the vehicle 1.

The image ImA includes the image Imc that shows at least one set candidate position C. The position and shape of each image Imc correspond to those of the corresponding candidate position C. In this example, the image ImA includes the images Imc respectively corresponding to the three candidate positions Cra to Crc included in the right row LR and the images Imc respectively corresponding to the three candidate positions Cla to Clc included in the left row LL. Each of the images Imc has, for example, a frame shape, such as a parallelogram and a rhombus. In this case, the frame of each image Imc may be, for example, arranged along the outer periphery of the corresponding candidate position C.

The image ImA includes the image Ims corresponding to the candidate position C in addition to the images Imc. The position and shape of the image Ims correspond to those of the candidate position C. In the example shown in FIG. 16, the image ImA includes the image Ims corresponding to the highest-rank candidate position Clb. In the example shown in FIG. 17, the image ImA includes the image Ims corresponding to the highest-rank candidate position Crb. The image Ims is formed by filling inside the frame of the image Imc. The image Ims has a feature, such as a different color from the images Imc, a higher luminance than the images Imc, a wider display region than the images Imc and wider display regions of the images Imc and the image Ims than those in the case of the images Imc only, in order that the image Ims is distinguished from the images Imc, and appears more prominent.

The images Imc and the image Ims may be additional images added to base images, highlight images partially highlighted, or transparent images that allow base images to transmit therethrough. The image ImA, for example, includes images captured by the imaging units 15, such as images Imd that indicate parking spaces not set for the candidate positions C.

In the example shown in FIG. 15, there are the candidate position Crb and the candidate position Clb, of which the rank is "1"; whereas, in the example shown in FIG. 16, the image Ims corresponding to only the candidate position Clb of these candidate positions Crb, Clb is displayed, and, in the example shown in FIG. 17, the image Ims corresponding to only the candidate position Crb is displayed. That is, in FIG. 16 and FIG. 17, for example, the image Ims corresponding to one selected, from among the plurality of candidate positions C of which the rank is "1",on the basis of another condition is displayed. In this case, for example, the ranking unit 151 may further rank the candidate positions Crb, Clb of which the rank is "1",and the output information control unit 146 and the display control unit 14d may control the display device 8 such that the image Ims corresponding to the higher-rank candidate position C resulting from the ranking is displayed. Alternatively, irrespective of the ranks, the output information control unit 146 and the display control unit 14d may control the display device 8 such that the image Ims corresponding to one of the candidate positions C is displayed by initial setting, or the like. An occupant, such as a driver, is allowed to perform a predetermined operation input to specify the candidate position C at which the image Ims is displayed as the target position. In this case, according to the configuration in which the image Ims corresponding to one of a plurality of the high-rank candidate positions C is displayed, for example, an occupant, such as a driver, may determine the target position through a relatively simple operation. The image ImA shown in FIG. 16 or FIG. 17 is updated as the vehicle 1 moves.

The acquisition unit 141 acquires input signals from the operation input unit 10, the operation unit 14g,the steering angle sensor 19, and the like. The output information control unit 146 and the display control unit 14d are able to change the display mode of the image ImA in response to the input signals. For example, the output information control unit 146 and the display control unit 14d are able to change the candidate position C to be associated with the image Ims in response to the rotation direction and rotation angle of the steering unit 4, which are obtained from the detection result of the steering angle sensor 19. In this case, the output information control unit 146 and the display control unit 14d control, for example, the display device 8 in an initial setting state such that only the image Ims corresponding to the left-side candidate position Clb, among the candidate positions Crb, Clb of which the rank is "1",is displayed as shown in FIG. 16. When the steering unit 4 is rotated by a predetermined angle or more in the clockwise direction, the output information control unit 146 and the display control unit 14d are able to control the display device 8 such that only the image Ims corresponding to the right-side candidate position Crb located on the right side in FIG. 17 is displayed as shown in FIG. 17. When the steering unit 4 is rotated by a predetermined angle or more in the counter-clockwise direction in the state shown in FIG. 17, the output information control unit 146 and the display control unit 14d are able to control the display device 8 such that only the image Ims corresponding to the left-side candidate position Clb located on the left side in FIG. 16 is displayed as shown in FIG. 16. With the above configuration, an occupant, such as a driver, is able to change the candidate position C to be associated with the image Ims among the plurality of candidate positions C in the image ImA by operating the steering unit 4. The output information control unit 146 and the display control unit 14d may control the display device 8 such that the image Ims corresponding to a candidate position of which the rank is "2" or "3" is displayed. In this case, the output information control unit 146 and the display control unit 14d may control the display device 8 such that the image Ims shifts among all the candidate positions C at which the images Imc are displayed in FIG. 16 or FIG. 17 in response to rotation of the steering unit 4. However, in this case as well, the output information control unit 146 and the display control unit 14d may control the display device 8 such that the image Ims corresponding to one of the highest-rank candidate positions Crb, Clb is displayed before an input is performed to select the candidate position C. That is, the image Ims functions as an image that provides a high-rank candidate position C, and also functions as a so-called cursor or pointer that indicates a selectable candidate position C.

The acquisition unit 141 is able to acquire input signals from the operation input unit 10, the operation unit 14g,the steering angle sensor 19, the shift sensor 21, and the like, in response to the display mode of the candidate positions C shown in FIG. 16, FIG. 17, or the like. Thus, the target position determination unit 145 is able to select, that is, determine, the target position from among at least one candidate position C on the basis of an input signal based on an operation input of an occupant, such as a driver, acquired by the acquisition unit 141. Specifically, for example, in a state where the image ImA illustrated in FIG. 16 is displayed on the display device 8, when the acquisition unit 141 has acquired a predetermined input signal, the target position determination unit 145 determines the candidate position Clb corresponding to the image Ims as the target position, and, in a state where the image ImA illustrated in FIG. 17 is displayed on the display device 8, when the acquisition unit 141 has acquired a predetermined input signal, the target position determination unit 145 determines the candidate position Crb corresponding to the image Ims as the target position. In a state where the image Ims corresponding to one candidate position C, among all the candidate positions C including the candidate positions of which the rank is "2" or "3",is displayed, when the acquisition unit 141 has acquired a predetermined input signal, the target position determination unit 145 may determine the candidate position C corresponding to the image Ims as the target position.

An output mode based on the rank of the candidate position C is not limited to the example shown in FIG. 16 or FIG. 17, and may be variously set or changed. For example, an image having different color, shape, design, or the like, may be displayed for each rank of the candidate position C. The images Imc corresponding to the candidate positions C, the image Ims corresponding to the rank and an image (not shown) that indicates a selected candidate position C may be different images. A selected candidate position C may be changed or the candidate position C at which the image Ims is displayed may be selected through operation of an operation unit other than the steering unit 4. The image ImA may be an image captured by another one of the imaging units 15, may be a synthesis of images captured by the plurality of imaging units 15 or may be an image subjected to coordinate transformation, image processing, or the like. The output information control unit 146 and the display control unit 14d may control the display device 12 such that an image based on the rank of the candidate position C is displayed. When a predetermined range within a candidate position C is not displayed in the image ImA, the ranking unit 151 may assign a low rank to the candidate position C or may set the candidate position C outside the ranking. The predetermined range in this case may be, for example, the entire area including four corners of the candidate position C or may be a half, three quarters, or the like, from the front side of the candidate position C. The output information control unit 146 and the audio control unit 14e may control the audio output device 9 such that audio based on the rank of the candidate position C is output. The audio control unit 14e is an example of the output control unit.

The target position determination unit 145 may determine the target position from among at least one set candidate position C on the basis of, for example, a predetermined condition irrespective of an operation input of an occupant, such as a driver. Even when the target position determination unit 145 automatically determines the target position, the target position may be changeable by an operation input of an occupant, such as a driver. The ranking unit 151 may rank each candidate position C on the basis of another condition such that one highest-rank candidate position C is obtained. In this case, the output information control unit 146 and the display control unit 14d control the display device 8 such that the image ImA from which the highest-rank candidate position C is recognizable is displayed, and the target position determination unit 145 determines the one highest-rank candidate position C as the target position through a predetermined operation input of an occupant, such as a driver, with respect to the image ImA.

Hereinafter, a procedure in which the ranking unit 151 determines the highest-rank candidate position C will be described. The ranking unit 151 initially ranks the candidate positions C for each of the rows LR, LL in accordance with the above-described procedure using the ranked areas R1 to R3. At this time, when there is only one candidate position C of which the rank is the highest, that is, the rank is "1", the target position determination unit 145 is able to determine the one highest-rank candidate position C as the target position.

When there are a plurality of highest-rank candidate positions C, for example, when there is the highest-rank candidate position C in each of the rows LR, LL, the ranking unit 151 is able to rank the candidate positions C on the basis of another condition described below.

The ranking unit 151 may rank the candidate positions C on the basis of the position of the vehicle 1 in the ranked area R1. When the vehicle 1 is too close to the candidate position C, it is more likely to increase switching between forward movement and rearward movement to move the vehicle 1 to the candidate position C tends to increase. Thus, the ranking unit 151, for example, sets a higher rank for the candidate position C regarding the vehicle 1 as the position of the vehicle 1 becomes closer to the curved partition line M2 spaced a predetermined distance from the candidate position C or the reference point O corresponding to the candidate position C.

Figure 18:
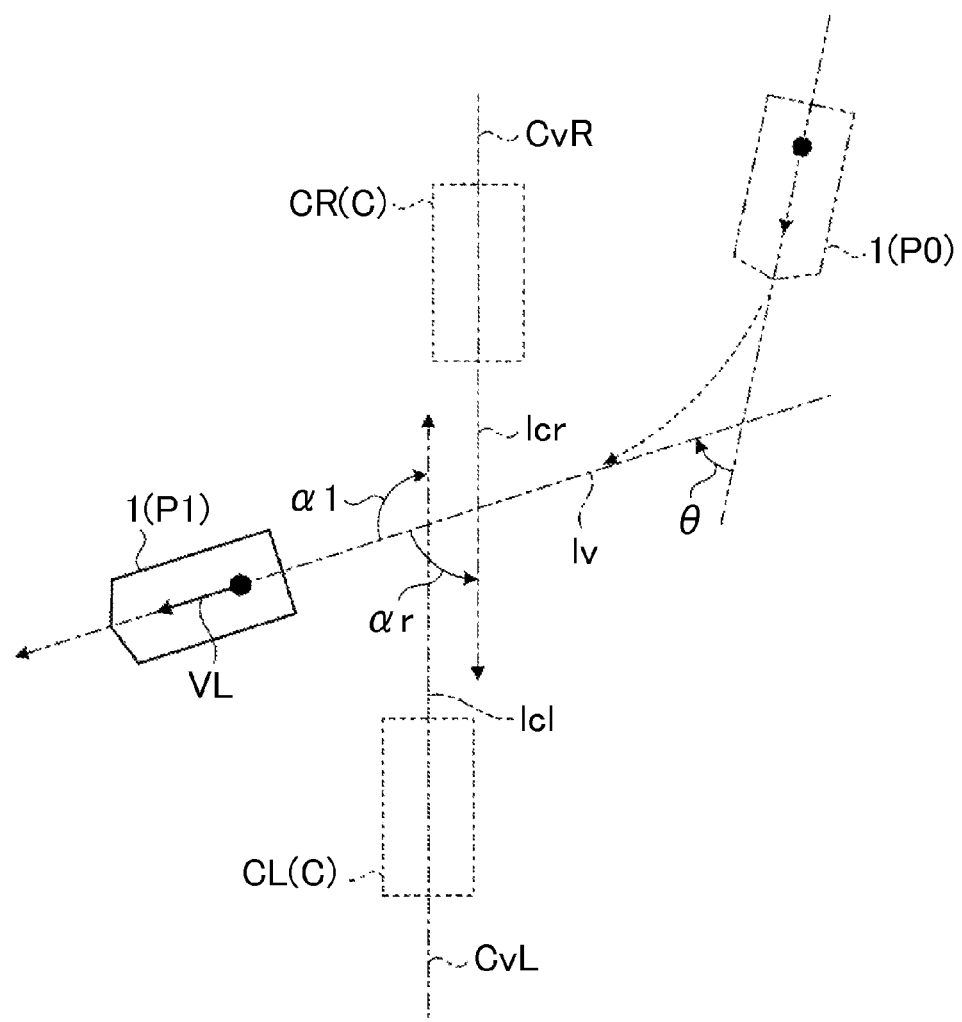
FIG. 18 is a schematic plan view for illustrating a first alternative example in which a plurality of candidate positions are ranked by the parking assist system according to the embodiment.

The ranking unit 151 may rank each candidate position C on the basis of the orientation of the vehicle 1, the candidate position C and the orientation Cv of the candidate position C. In this case, as illustrated in FIG. 18, the ranking unit 151 initially calculates, for example, an angle αr between an orientation VL of the vehicle 1 and an orientation CvR of a candidate position CR and an angle αl between the orientation VL of the vehicle 1 and an orientation CvL of a candidate position CL. Each of the orientations VL, CvR, CvL is based on a position in which the vehicle 1 is placed at a corresponding one of the positions, and is coincident with, for example, the forward side of the vehicle 1 in the longitudinal direction at each position. The angle αr is a turning angle of the vehicle 1 on the assumption that the vehicle 1 turns from the orientation VL to the orientation CvR. The angle αl is a turning angle of the vehicle 1 on the assumption that the vehicle 1 turns from the orientation VL to the orientation CvL. That is, the angle αr corresponding to the candidate position CR is an angle in a leftward direction (counter-clockwise direction) that is a turning direction at the time when the vehicle 1 moves to the candidate position CR from a center line lv at a position P1 of the vehicle 1 to a center line lcr at the candidate position CR, and the angle αl corresponding to the candidate position CL is an angle in a rightward direction (clockwise direction) that is a turning direction at the time when the vehicle 1 moves to the candidate position CL from the center line lv at the position P1 of the vehicle 1 to a center line lcl at the candidate position CL. As the turning angle from the position P1 of the vehicle 1 to the candidate position CR or the candidate position CL increases, the vehicle 1 becomes difficult to move. Thus, the ranking unit 151 compares the angle αr with the angle αl, and sets ranks such that the rank of the candidate position C corresponding to one of the angles αr, αl, which is smaller than the other, is higher than the rank of the candidate position C corresponding to one of the angles αr, αl, which is larger than the other. In the example shown in FIG. 18, the angle αr is smaller than the angle αl. Thus, the ranking unit 151 sets ranks such that the rank of the candidate position CR corresponding to the angle αr is higher than the rank of the candidate position CL corresponding to the angle αl. Thus, the target position determination unit 145 can preferentially determine a candidate position C that allows the vehicle to move smoothly with higher possibility, as the target position. The turning angles αr, αl are not angles at the time when the vehicle 1 actually turns but angles that are geometrically obtained from the orientation VL of the vehicle 1 and the orientation Cv of each candidate position C. Thus, each turning angle may be referred to as estimated turning angle.

The ranking unit 151 may rank each candidate position C on the basis of the position of the vehicle 1, a minimum turning radius of the vehicle 1, and the candidate position C. In this case, as illustrated in FIG. 19, the ranking unit 151 calculates, for example, a circular arc Cvr that has a curvature equal to the minimum turning radius, corresponding to the candidate position CR, and a circular arc Cvl that has a curvature equal to the minimum turning radius, corresponding to the candidate position CL. The circular arc Cvr has a tangent line along the longitudinal direction of the vehicle 1 at the position P of the vehicle 1, and curves, that is, approaches, toward the candidate position CR. The circular arc Cvl has a tangent line along the longitudinal direction of the vehicle 1 at the position P of the vehicle 1, and curves, that is, approaches, toward the candidate position CL. Each of the circular arcs Cvr, Cvl may also be referred to as trajectory or path. When a candidate position C is located on the circular arcs Cvr, Cvl of the minimum turning radius or radially outside the circular arcs Cvr, Cvl, it is highly likely that the vehicle 1 may move from the position P of the vehicle 1 to the candidate position CR or the candidate position CL without switching between forward movement and rearward movement. Thus, the ranking unit 151 sets ranks such that the rank of a candidate position C located on the circular arcs Cvr, Cvl of the minimum turning radius or radially outside of the circular arcs Cvr, Cvl is higher than the rank of a candidate position C located radially inside of the circular arcs Cvr, Cvl. In the example shown in FIG. 19, the candidate position CR is located on the circular arc Cvr, and the candidate position CL is located radially inside of the circular arc Cvl. Thus, the ranking unit 151 sets ranks such that the rank of the candidate position CR is higher than the rank of the candidate position CL. Thus, the target position determination unit 145 can preferentially determine a candidate position C that allows the vehicle 1 to move smoothly with higher possibility, as the target position.

Figure 20:
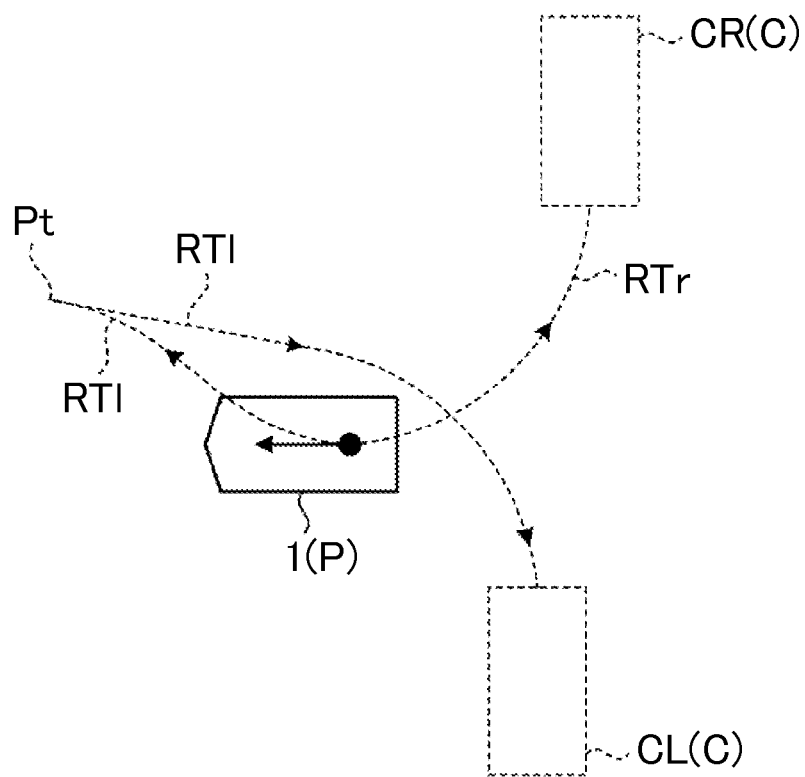
FIG. 20 is a schematic plan view for illustrating a third alternative example in which a plurality of candidate positions are ranked by the parking assist system according to the embodiment.

The ranking unit 151 may rank each candidate position C on the basis of a path from the position of the vehicle 1 to the candidate position C. In this case, as illustrated in FIG. 20, the path calculation unit 147 calculates, for example, a path RTr from the position P of the vehicle 1 to the candidate position CR and a path RTl from the position P of the vehicle 1 to the candidate position CL. The ranking unit 151 sets ranks such that the rank of the candidate position CR for which the path RTr without switching between forward movement and rearward movement is calculated is higher than the rank of the candidate position CL for which the path RTl that necessarily includes switching between forward movement and rearward movement in terms of the performance of the vehicle 1. Thus, the target position determination unit 145 can preferentially determine a candidate position C that allows the vehicle 1 to move smoothly with higher possibility, as the target position.

The ranking unit 151 may assign the above-described ranks set for the candidate positions C without using the ranked areas R1 to R3 in addition to the ranks obtained by using the ranked areas R1 to R3 or may assign new ranks that reflect a plurality of ranks including the ranks obtained by using the ranked areas R1 to R3. As for ranking of the candidate positions C to the right side and left side of the vehicle 1, a set condition for raising the rank of a candidate position C at, for example, a side to which a direction indicator light indicates, a side opposite to a turning direction just before the vehicle 1 stops, a side opposite to a driver seat, a side of which the number of times set as a target position previously is large, a side that is specified in advance by an occupant, such as a driver, or the like, may be incorporated.

Figure 21:
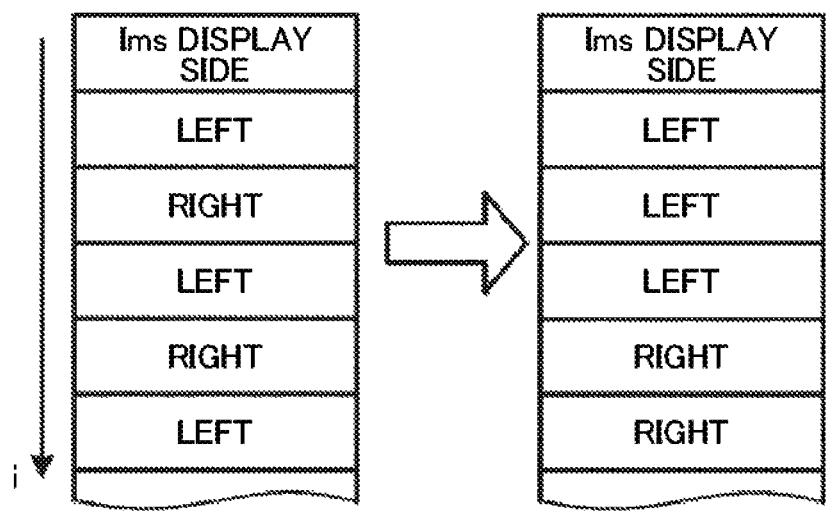
FIG. 21 shows an example of a change of a side at which the highest-rank candidate position is set by the parking assist system according to the embodiment.

As described above, in the present embodiment, for example, the output information control unit 146 and the display control unit 14d control the display device 8 such that the image Ims corresponding to a high-rank candidate positon C is displayed together with the image Imc corresponding to at least one candidate position C before an input is performed to select the candidate position C. The image ImA shown in FIG. 16 or FIG. 17 changes as the vehicle 1 moves, and the ECU 14 updates the candidate positions C and the rank of each candidate position C. Thus, if there arises a situation that the rank of a candidate position C on the left side of the vehicle 1 and the rank of a candidate position C on the right side of the vehicle 1 are alternately set to the highest rank as a result of the above-described ranking by the ranking unit 151, a display position of the image Ims in the image ImA of the display device 8 may frequently switch between the right side and the left side as illustrated in FIG. 21. A parameter i in FIG. 21 is the number of times the candidate position C associated with which the image Ims switches.

When, for example, the image Ims of one of the right-side candidate position C and left-side candidate position C of the vehicle 1 is displayed, the ranking unit 151 adjusts a condition or parameter for determining the rank of the one of the candidate positions C such that the rank tends to be higher. Specifically, for example, the control is implemented by adjusting a turning angle as a parameter for ranking. That is, it is assumed that, at time at which the ranking unit 151 ranks the right-side candidate position C and the left-side candidate position C or at time just before then, the image Ims corresponding to the left-side candidate position Clb is displayed in the image ImA as illustrated in FIG. 16. In this case, at the time when the ranking unit 151 compares the angle αr of the right-side candidate position C with the angle αl of the left-side candidate position C, the ranking unit 151 makes a correction to reduce the angle αl corresponding to the left-side candidate position C by a predetermined amount or makes a correction to increase the angle αr corresponding to the right-side candidate position C by a predetermined amount such that the rank of the left-side candidate position C tends to be higher. The ranking unit 151 then determines ranks by comparing the corrected angles αr, αl with each other. In this case, the rank of the left-side candidate position C tends to be higher. This prevents a situation that the rank of the right-side candidate position C becomes higher and the image Ims corresponding to the right-side candidate position C is displayed. Thus, frequent switching of the image Ims between the right side and the left side in the image ImA is suppressed.

The control may also be implemented by another parameter. For example, the control may be implemented by a minimum turning radius as a parameter for ranking. Specifically, it is assumed that, at time at which the ranking unit 151 makes ranking or at time just before then, the image Ims of one of the right-side candidate position C and left-side candidate position C of the vehicle 1 is displayed. In this case, the ranking unit 151 carries out determination as to a positional condition by making a correction to increase the minimum turning radius, which is a condition (threshold) for determination as to the other of the right-side candidate position C and left-side candidate position C, by a predetermined amount. Thus, the rank of the other of the right-side candidate position C and left-side candidate position C tends to be lower. In this case as well, frequent switching of the image Ims between the right side and the left side in the image ImA is suppressed. By such control, as shown in the right side of FIG. 21, a display position of the image Ims in the image ImA on the display device 8 becomes difficult to change between the right side and the left side. The control may also be implemented by another parameter. A condition or a parameter may be temporarily adjusted, for example, for a predetermined period from time at which a side (display side) on which the image Ims is displayed has switched.

A similar advantageous effect may also be achieved by another mode. For example, when the candidate position C corresponding to the displayed image Ims has switched from a state where the image Ims is located on the left side of the vehicle 1 (host vehicle) to a state where the image Ims is located on the right side, the output information control unit 146 and the display control unit 14d controls the display device 8 such that the image Ims corresponding to the right-side high-rank candidate position C is displayed temporarily (for a set period) from the switched time. When the candidate position C corresponding to the displayed image Ims has switched from a state where the image Ims is located on the right side of the vehicle 1 (host vehicle) to a state where the image Ims is located on the left side, the output information control unit 146 and the display control unit 14d controls the display device 8 such that the image Ims corresponding to the left-side high-rank candidate position C is displayed temporarily (for a set period) from the switched time. In this case as well, an advantageous effect as shown in FIG. 21 is obtained.

However, when the vehicle 1 has turned by a large amount, candidate positions C may be set in a place different from before in many cases, which leads to less advantage in keeping the side on which the image Ims is displayed. In the present embodiment, when a turning angle θ from a position P0 of the vehicle 1 at previous time as shown in FIG. 18 to a position P1 of the vehicle 1 at current time is larger than or equal to a predetermined angle θth (threshold), the ranking unit 151, the output information control unit 146, the display control unit 14d, or the like, cancels control for ranking or displaying in order for the image Ims not to frequently switch a display position between the right side and the left side. Thus, for example, a situation that the image Ims is displayed on a side that is difficult to be determined as the target position in the case where the vehicle 1 has turned can be prevented.

As described above, in the present embodiment, for example, the ranking unit 151 ranks each of the at least one candidate positions C on the basis of the orientation of the vehicle 1 (host vehicle) and the orientation Cv. Thus, according to the present embodiment, for example, a candidate position C that allows smoother or less inconvenient parking assist can be determined as the target position on the basis of ranks assigned to the candidate positions C on the basis of the orientation of the vehicle 1 and the orientations Cv.

In the present embodiment, for example, the ranking unit 151 decreases the rank of a candidate position C as a turning angle from the position of the vehicle 1 to the candidate position C increases. In other words, when a turning angle from the position of the vehicle 1 to a first candidate position C is larger than a turning angle from the position of the vehicle 1 to a second candidate position C, the rank of the first candidate position C is set so as to be lower than the rank of the second candidate position C. Thus, for example, a candidate position C that allows smoother or less inconvenient parking assist with a smaller turning angle tends to be determined as the target position.

In the present embodiment, for example, the output information control unit 146 and the display control unit 14d (output control unit) may display an image ImA of the outside of the vehicle, including images Imc respectively corresponding to candidate positions C and an image Ims that indicates a candidate position C selectable as a target position, and may control the display device 8 or the display device 12 such that the image Ims shifts among a plurality of candidate positions C in response to an input signal acquired by the acquisition unit 141, and the target position determination unit 145 may determine a candidate position C corresponding to the image Ims displayed at time at which the acquisition unit 141 has acquired another input signal, as a target position. Thus, for example, an occupant, such as a driver, can further easily select the target position.

In the present embodiment, for example, the output information control unit 146 and the display control unit 14d (output control unit) control the display device 8 such that the image Ims corresponding to a high-rank candidate position C is displayed before an input is performed to select a candidate position C by an occupant, such as a driver. Thus, for example, a candidate position C that allows smoother or less inconvenient parking assist tends to be determined as the target position.

In the present embodiment, for example, when the image Ims corresponding to a candidate position C located on one of right side and left side of the vehicle 1 (host vehicle) is displayed, the ranking unit 151 adjusts a condition or a parameter that is used to determine ranks of candidate positions C such that a rank of a candidate position C located on the one of the right side and the left side tends to be higher than a rank of a candidate position C located on the other of the right side and left side. Thus, for example, frequent switching of a display position of the image Ims between the right side and the left side on the display device 8 may be suppressed.

In the present embodiment, for example, when the vehicle 1 (host vehicle) has turned a predetermined angle θth or more, the output information control unit 146 and the display control unit 14d (output control unit) invalidate the adjusted condition or parameter. Thus, for example, a situation that the image Ims is displayed on a side that is difficult to be determined as the target position in the case where the vehicle 1 has turned can be suppressed.

In the present embodiment, for example, when the candidate position C corresponding to the image Ims displayed before an input is performed to select the candidate position C has switched from a state where the image Ims is located on one of the right side and left side of the vehicle 1 (host vehicle) to a state where the image Ims is located on the other of the right side and left side, the output information control unit 146 and the display control unit 14d (output control unit) control the display device 8 such that the image Ims corresponding to the high-rank candidate position C on the other of the right side and left side is displayed temporarily from the switched time. Thus, for example, frequent switching of a display position of the image Ims between the right side and the left side on the display device 8 can be suppressed.

In the present embodiment, for example, when the vehicle 1 (host vehicle) has turned the predetermined angle θth or more, the output information control unit 146 and the display control unit 14d (output control unit) cancel temporal control of the display device 8 in which the image Ims corresponding to the high-rank candidate position C on the other of the right side and left side is displayed. Thus, for example, a situation that the image Ims is displayed on a side that is difficult to be determined as the target position in the case where the vehicle 1 has turned can be prevented.

The embodiment of the invention is illustrated above; however, the above-described embodiment is illustrative, and is not intended to limit the scope of the invention. The embodiment may be implemented in other various modes, and elements thereof may be variously omitted, replaced, combined or changed without departing from the scope of the invention. The components and shapes of each embodiment may be partially replaced. The specifications (structure, type, orientation, shape, size, length, width, height, number, arrangement, position, and the like) of each component, or the like, may be changed as needed. For example, the invention is also applicable to parking other than the above described side-by-side parking, such as parallel parking. The invention is applicable to parking assist in parking places and parking spaces in various types. With respect to the position and orientation of the vehicle and the candidate position and its orientation, the way of detection, the way of setting, references may be variously set or changed. An input signal may be based on an audio input to a microphone.

What is claimed is:

1. A parking assist system comprising
    a central processing unit configured to:
        set at least one candidate position that is a candidate for
            a target position by selecting the at least one candidate
            position from positions on a right side and a left side of a vehicle on the basis of at least one of a detection result of an obstacle and a detection result of a parking boundary;
set an orientation of the vehicle at each of the at least one candidate position, as a candidate position vehicle orientation, on the basis of at least one of the detection result of the obstacle and the detection result of the parking boundary;
rank each of the at least one candidate position on the basis of an orientation of the vehicle and the candidate position vehicle orientation; and
determine one of the ranked at least one candidate position as the target position,
the central processing unit being further configured to set, when a first candidate position on one of the right side and the left side of the vehicle and a second candidate position on the other of the right side and the left side of the vehicle are set as the at least one candidate position and a turning angle from a position of the vehicle to the first candidate position is larger than a turning angle from the position of the vehicle to the second candidate position, a rank of the first candidate position and a rank of the second candidate position such that the rank of the first candidate position is lower than the rank of the second candidate position;
wherein the central processing unit is configured to:

when a plurality of candidate positions are set as the at least one candidate position, control a display device such that an image including first images corresponding to the plurality of the candidate positions and a second imane that indicates a candidate position selectable as the target position displayed; and
before an input signal that indicates a command to change the candidate position corresponding to the second image is acquired, control the display device such that the second image is displayed corresponding to a candidate position having a high rank;
wherein the central tnrocessina unit is configured to adjust,when the second image corresponding to a candidate position located on one of a right side and a left side of the vehicle is displayed, one of a condition and a parameter that is used to determine ranks of the plurality of candidate position such that a rank of a candidate position located on the one of right side and the left side tends to be higher than a rank of a candidate position located on the other of the right side and the left side; and
wherein the central processing unit is configured to invalidate the adjusted one of the condition and the parameter when the vehicle has turned a nredetermined angle or more.

* * * * *